United States Patent
Simonoff

(10) Patent No.: US 9,792,651 B2
(45) Date of Patent: Oct. 17, 2017

(54) SYSTEM AND METHOD FOR DELAYING EXECUTION OF FINANCIAL TRANSACTIONS

(71) Applicant: Jerome Simonoff, Marina del Rey, CA (US)

(72) Inventor: Jerome Simonoff, Marina del Rey, CA (US)

(73) Assignee: FAIR TRADING DEVICES LLC, Marina Del Rey, CA (US)

( * ) Notice: Subject to any disclaimer, the term of this patent is extended or adjusted under 35 U.S.C. 154(b) by 0 days.

(21) Appl. No.: 13/710,391

(22) Filed: Dec. 10, 2012

(65) Prior Publication Data

US 2013/0151391 A1    Jun. 13, 2013

Related U.S. Application Data

(60) Provisional application No. 61/569,175, filed on Dec. 9, 2011, provisional application No. 61/734,877, filed on Dec. 7, 2012.

(51) Int. Cl.
G06Q 40/00    (2012.01)
G06Q 40/04    (2012.01)

(52) U.S. Cl.
CPC .................................. *G06Q 40/04* (2013.01)

(58) Field of Classification Search
CPC ..................................................... G06Q 40/04
See application file for complete search history.

(56) References Cited

U.S. PATENT DOCUMENTS

| | | | | |
|---|---|---|---|---|
| 6,134,535 | A * | 10/2000 | Belzberg | 705/36 R |
| 6,247,000 | B1 * | 6/2001 | Hawkins et al. | 705/37 |
| 6,493,809 | B1 * | 12/2002 | Safranek et al. | 711/167 |
| 7,219,149 | B2 * | 5/2007 | Ofir et al. | 709/224 |
| 8,301,180 | B1 * | 10/2012 | Gailloux et al. | 455/466 |
| 8,655,755 | B2 * | 2/2014 | Tully et al. | 705/35 |
| 8,788,396 | B2 * | 7/2014 | Cole et al. | 705/37 |
| 2002/0194357 | A1 * | 12/2002 | Harris et al. | 709/232 |
| 2004/0068501 | A1 * | 4/2004 | McGoveran | 707/8 |
| 2004/0167840 | A1 * | 8/2004 | Tully et al. | 705/35 |
| 2005/0055316 | A1 * | 3/2005 | Williams | 705/65 |

(Continued)

FOREIGN PATENT DOCUMENTS

JP    009229234    * 10/2009

OTHER PUBLICATIONS

Unknown, IEEE 100 The Authoritative Dictiionary of IEEE Standards Terms Seventh Edition, 2000, IEEE, pp. 182-183, 687.*

(Continued)

*Primary Examiner* — Scott S Trotter
(74) *Attorney, Agent, or Firm* — Morgan, Lewis & Bockius LLP

(57) ABSTRACT

A system, computer-readable storage medium storing at least one program, and a computer-implemented method for delaying execution of financial transactions. A first message including data for a first financial transaction is received, the first message being uncorrupted. A first trading symbol that is a target of the first financial transaction is determined. The first trading symbol is determined to be a target of at least one financial transaction that was included in at least one previous message that was determined to be corrupted. Execution of the first financial transaction is delayed.

8 Claims, 16 Drawing Sheets

(56) References Cited

U.S. PATENT DOCUMENTS

| | | | |
|---|---|---|---|
| 2005/0192888 A1* | 9/2005 | Lennane et al. | 705/37 |
| 2007/0124210 A1* | 5/2007 | Chiappetti et al. | 705/21 |
| 2007/0192254 A1* | 8/2007 | Hinkle | 705/51 |
| 2008/0120129 A1* | 5/2008 | Seubert et al. | 705/1 |
| 2008/0288390 A1 | 11/2008 | Maynard | |
| 2010/0049821 A1* | 2/2010 | Oved | 709/212 |
| 2010/0063888 A1* | 3/2010 | Sajkowsky | 705/17 |
| 2010/0138360 A1* | 6/2010 | Cutler et al. | 705/36 R |
| 2010/0162249 A1* | 6/2010 | Shpeisman et al. | 718/101 |
| 2011/0004816 A1* | 1/2011 | Wood et al. | 714/807 |
| 2011/0087581 A1* | 4/2011 | Ram et al. | 705/37 |
| 2011/0166982 A1* | 7/2011 | Cole et al. | 705/37 |
| 2011/0264898 A1* | 10/2011 | Chaudhry et al. | 712/228 |
| 2011/0295736 A1* | 12/2011 | Freer et al. | 705/37 |

OTHER PUBLICATIONS

IEEE 100 "The Authoritatie Dictionary of IEEE Standards Terms Seventh Editor," IEEE Std 100-2000, vol., No., pp. 2000, doi:10.1109/IEEESTD.2000.322230, URL: http://ieeexplore.ieee.org/stamp/stamp.jsp?tp=&arnumber=4116787&isnumber=4116786, 1 pg.

Simonoff, Jerome, International Preliminary Report on Patentability PCT/US2012/068799, dated Jun. 10, 2014, 8 pgs.

Simonoff, Jerome, Extended European Search Report, EP12809450.5, dated Jul. 8, 2015, 12 pgs.

Simonoff, Jerome, International Search Report and Written Opinion, PCT/US2012/068799, dated May 31, 2013, 10 pgs.

* cited by examiner

SYSTEM AND METHOD FOR DELAYING EXECUTION OF FINANCIAL TRANSACTIONS

RELATED APPLICATIONS

This application claims priority to U.S. Provisional Patent Application No. 61/569,175, "System and Method for Delaying Execution of Financial Transactions," filed Dec. 9, 2011, and U.S. Provisional Application Ser. No. 61/734,877, "System and Method for Delaying Execution of Financial Transactions," filed on Dec. 7, 2012, both of which are hereby incorporated by reference in their entireties.

TECHNICAL FIELD

The disclosed embodiments relate generally to delaying execution of financial transactions.

BACKGROUND

Many financial transactions involving financial instruments (e.g., stocks, bonds, commodities, etc.) are time-sensitive transactions. When information relating to a financial instrument (e.g., a price of the financial instrument) is disseminated to entities (e.g., traders, financial institutions, etc.), a particular entity may realize a profit if a financial transaction involving the financial instrument that was issued by the entity in response to receiving the disseminated information is the first financial transaction involving the financial instrument to be executed with respect to all other financial transactions involving the financial instrument in response to the disseminated information.

One technique for increasing the likelihood that the financial transaction involving the financial instrument issued by entity will be the first financial transaction involving the financial instrument is to minimize the time interval between (1) a time when time-sensitive information relating to the financial instrument is disseminated and (2) a time when a financial transaction server executes (i.e., fulfills) a financial transaction involving the financial instrument that was issued by an entity in response to receiving the time-sensitive information relating to the financial instrument. One technique for minimizing this time interval is to reduce the network latency between a computer system of an entity and the financial transaction server. For example, the computer system for the entity may be coupled to the financial transaction server via a low-latency network. In another example, the computer system for the entity may be located within the same data center that houses the financial transaction server.

Another technique for increasing the likelihood that the financial transaction involving the financial instrument issued by entity will be the first financial transaction involving the financial instrument is for the entity to intercept and corrupt messages including financial transactions involving the financial instrument that were issued by other entities. Once the messages have been corrupted, the financial transaction server discards the message and accordingly, does not execute the financial transactions included in the discarded messages.

Unfortunately, these techniques create an inequity between entities that have the means to increase the likelihood that their financial transactions will be the first financial transaction to be executed by the financial transaction server.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

DETAILED DESCRIPTION

The embodiments described herein provide techniques for delaying execution of financial transactions.

Figure 1:
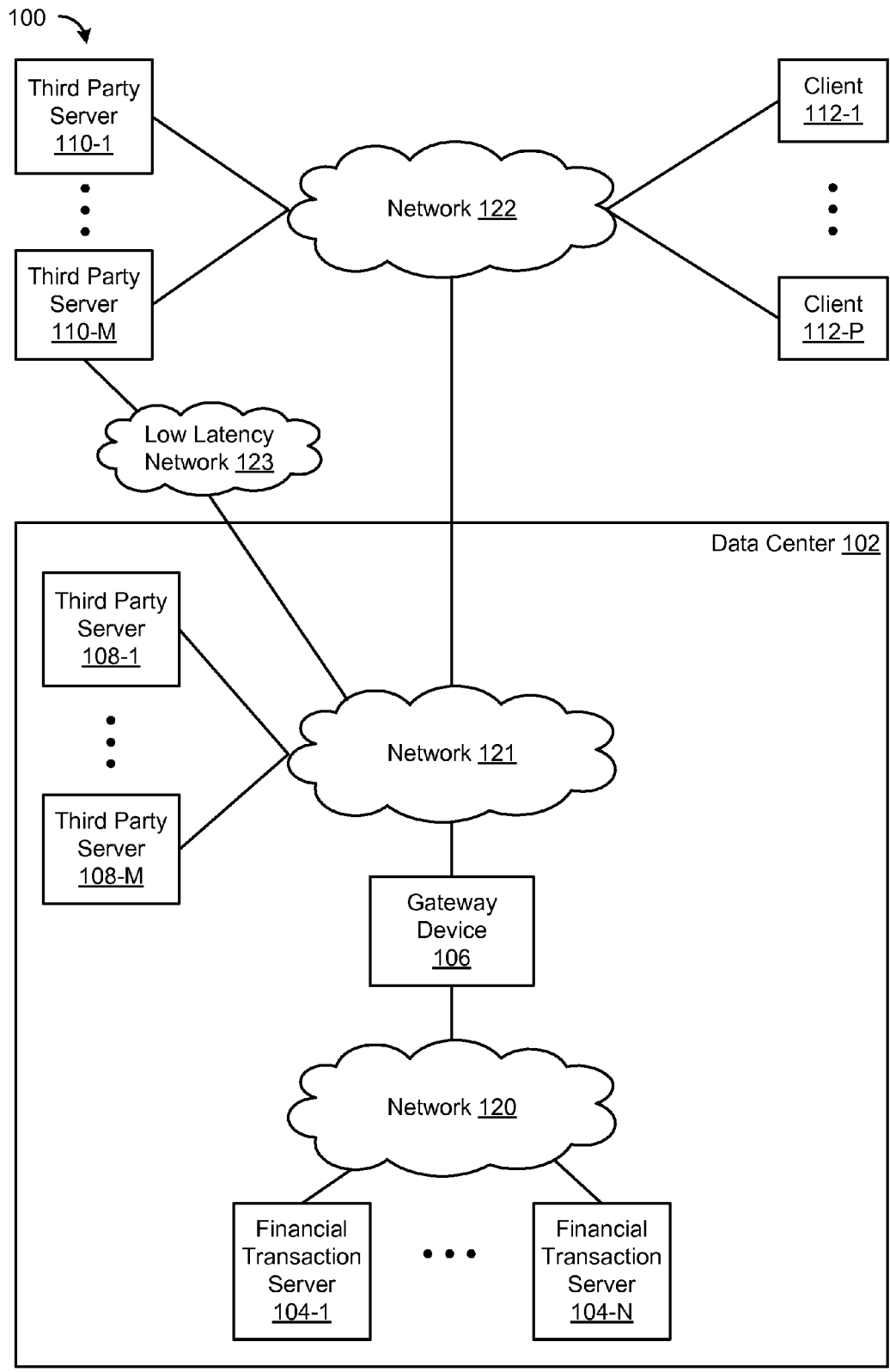
FIG. 1 is a block diagram illustrating a network system, according to some embodiments.

FIG. 1 is a block diagram illustrating a network system 100, according to some embodiments. The network system 100 includes a data center 102 that houses financial transaction servers 104. Financial transaction servers 104 execute (fulfill) financial transactions involving financial instruments. For example, financial transaction servers 104 may execute transactions involving stocks (e.g., buy orders, sell orders, etc.). In some embodiments, financial transaction servers 104 publish (or otherwise disseminate) information relating to financial instruments for which that financial transaction servers 104 can execute financial transactions. For example, financial transaction servers 104 may publish information relating to ask and bid prices of stocks for which that financial transaction servers 104 can execute financial transactions. In some embodiments, the information relating to financial instruments for which financial transaction servers 104 can execute financial transactions are published by another server (or set of servers) that may or may not be associated with an entity that operates financial transaction servers 104.

The network system 100 also includes third party servers 108 and 110. Third party servers 108 and/or 110 may receive financial transactions involving financial instruments and may issue these financial transactions to financial transaction servers 104. In some implementations, these financial transactions are received from a program (e.g., a program trade). In some implementations, these financial transactions are received from end users via clients systems or devices 112 (also herein called clients 112). Third party servers 108 are located in data center 102, while third party servers 110 are located outside of data center 102. Accordingly, the network latency between third party servers 108 and financial transaction servers 104 is lower than the network latency between third party servers 110 and financial transaction servers 104. Stated another way, messages sent to third party servers 108 by financial transaction servers 104 and messages sent by third party servers 108 to financial transaction servers 104 require less time to reach their respective destinations than messages sent to third party servers 110 by financial transaction servers 104 and messages sent by third party servers 110 to financial transaction servers 104.

The network system 100 also includes clients 112 that are used by end users to issue requests for financial transaction servers 104 to execute (fulfill) financial transactions involving financial instruments. Clients 112 typically do not have direct access to financial transaction servers 104 and, therefore, typically issue requests for financial transaction servers 104 to execute financial transactions via third party servers 108 and/or 110.

Network 121 of data center 102, clients 112, and third party servers 110 are coupled to each other via network 122. Network 121 is an internal network of the data center 102 and can generally include any type of wired or wireless communication channel capable of coupling together computing nodes. This includes, but is not limited to, a local area network, a wide area network, or a combination of networks. Network 122 can generally include any type of wired or wireless communication channel capable of coupling together computing nodes. This includes, but is not limited to, a local area network, a wide area network, or a combination of networks. In some embodiments, network 122 includes the Internet.

In some embodiments, at least one third party server 110 is coupled to network 121 of the data center 102 via low latency network 123, which provides a low latency network connection to network 121 of the data center 102. As illustrated in FIG. 1, third party server 110-M is coupled to the data center 102 via low latency network 123. Low latency network 123 can generally include any type of wired or wireless communication channel capable of coupling together computing nodes. This includes, but is not limited to, a local area network, a wide area network, or a combination of networks. Note that even though third party server 110-M is coupled to the network 121 of the data center 102 via low latency network 123, messages sent to third party servers 110 by financial transaction servers 104 and messages sent by third party servers 110 to financial transaction servers 104 typically require more time than messages sent to third party servers 108 by financial transaction servers 104 and messages sent by the third party servers 108 to financial transaction servers 104.

In some embodiments, a gateway device 106 couples network 121 of the data center 102 to financial transaction servers 104 via network 120. Network 120 is a private network for financial transaction servers 104 and cannot be accessed directly by the third party servers 108, the third party servers 110, or the clients 112. Network 120 can generally include any type of wired or wireless communication channel capable of coupling together computing nodes. This includes, but is not limited to, a local area network, a wide area network, or a combination of networks.

In some embodiments, gateway device 106 inspects messages received via network 121 and conditionally delays the execution of financial transactions that are included in the messages based on whether the financial instruments involved in the financial transactions correspond to financial transactions involving financial instruments that were included in messages that were corrupted.

In some embodiments, gateway device 106 preempts processing of the messages by standard procedures of the protocol on which the messages were sent. In these embodiments, gateway device 106 processes messages based on a protocol on which the messages were sent. For example, if the messages were sent using the TCP/IP protocol, gateway device 106 receives and processes the messages before the standard procedures of the TCP/IP protocol process the messages. In doing so, gateway device 106 can detect corrupted packets and handle these packets as described below. It is noted that if standard procedures of the TCP/IP protocol were to process a message that has been corrupted, the procedures of the TCP/IP protocol might discard the message before gateway device 106 had a chance to process the message.

Gateway device 106 is described in more detail below with reference to FIGS. 2-13.

Note that although FIG. 1 shows one instance of gateway device 106, multiple gateway devices may be present in the network system 100. For example, gateway device 106 may include a plurality of distributed gateway devices. The plurality of distributed gateway devices may provide load balancing.

Also note that although the embodiments described herein refer to gateway device 106, the embodiments may be applied to multiple gateway devices. Furthermore, the functionality of gateway device 106 may be implemented within a single gateway device or a set of gateway devices.

FIGS. 2A to 2E illustrate a process of processing messages and conditionally delaying financial transactions based on the processing of the messages, in accordance with some embodiments. Gateway device 106 illustrated in FIGS. 2A to 2E includes a message inspection module 202, a transaction processing module 204, an interfered transactions list 206, a quarantined transactions list 208, and a latency fairness list 210. These elements of gateway device 106 are described in more detail below.

Figure 2A:
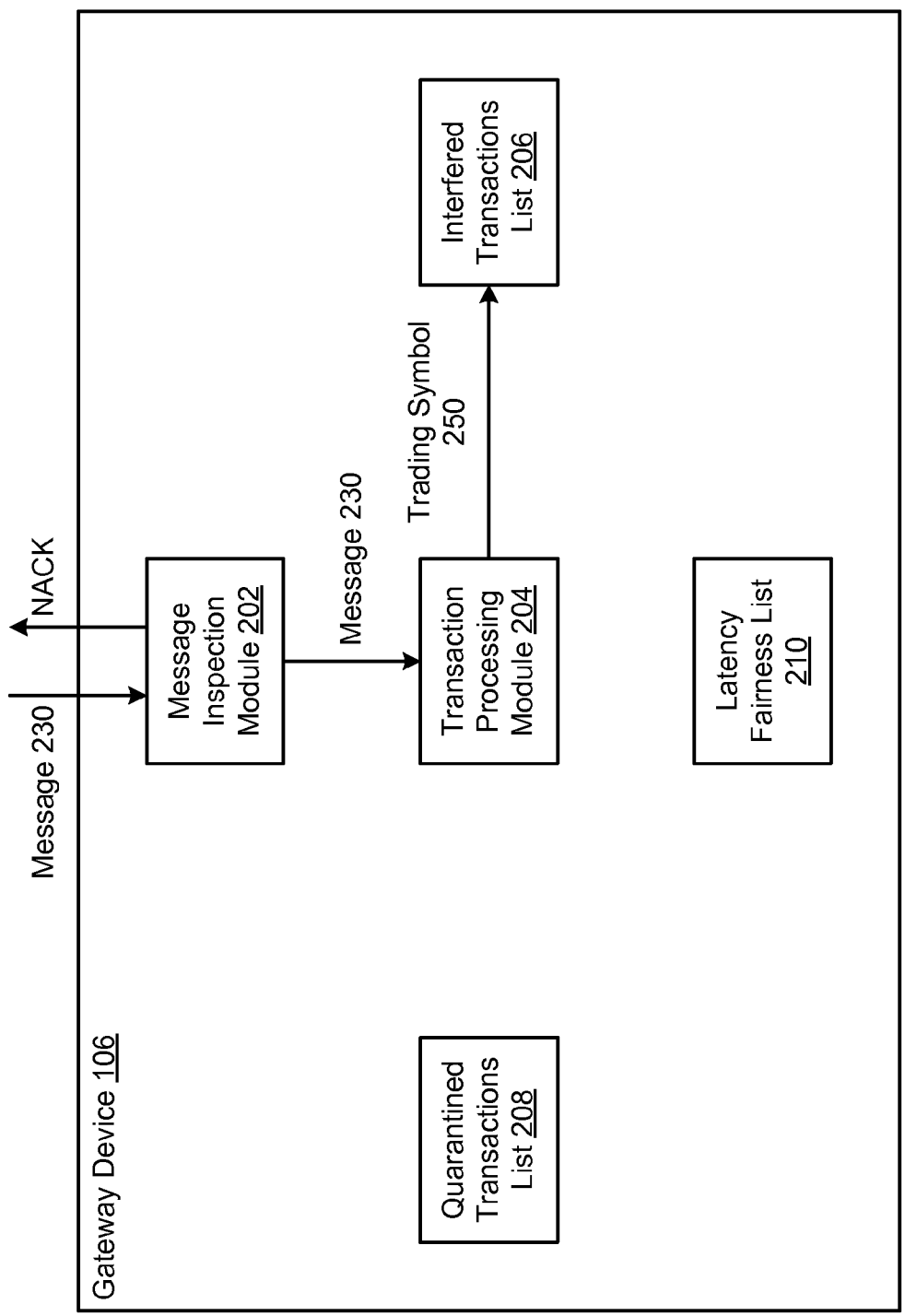
FIG. 2A is a block diagram illustrating a process of processing a corrupted message, according to some embodiments.

In FIG. 2A, a message inspection module 202 of gateway device 106 receives a message 230. The message inspection module 202 inspects message 230 and, in this example, determines that message 230 is corrupted. Gateway device 106, and specifically, message inspection module 202, inspects message 230 in lieu of the standard procedures of the protocol on which the message was sent. In some embodiments, when message 230 is composed of multiple packets and at least one packet of message 230 is corrupted, message 230 is deemed to be corrupted. Furthermore, when message 230 is composed of a single packet and the single packet of message 230 is corrupted, message 230 is deemed to be corrupted.

In some embodiments, after determining that message 230 is corrupted, message inspection module 202 transmits a negative acknowledgment (NACK) message to a sender of message 230 using the same protocol as the protocol that the sender of message 230 used to send message 230 to gateway device 106 if the protocol provides and the uncorrupt information permits. The NACK message notifies the sender that message 230 was received with errors. Typically, the sender of message 230 will retransmit message 230 to gateway device 106 in response to receiving the NACK message, but the sender's response to the NACK message may vary depending on the protocol used.

The message inspection module 202 then provides message 230 to transaction processing module 204. Since message 230 has been deemed to be corrupted, transaction processing module 204 extracts data (or attempts to extract data) for financial transactions included in message 230. For example, transaction processing module 204 may extract the following data from message 230: identifiers for entities (e.g., traders) associated with financial transactions included in message 230, identifiers for financial instruments (e.g., trading symbols of stocks, derivatives, commodities, etc.) corresponding to the financial transactions included in message 230, and/or actions to be taken with respect to the financial instruments corresponding to the financial transactions included in message 230 (e.g., buy orders, sell orders, etc.).

Figure 3:
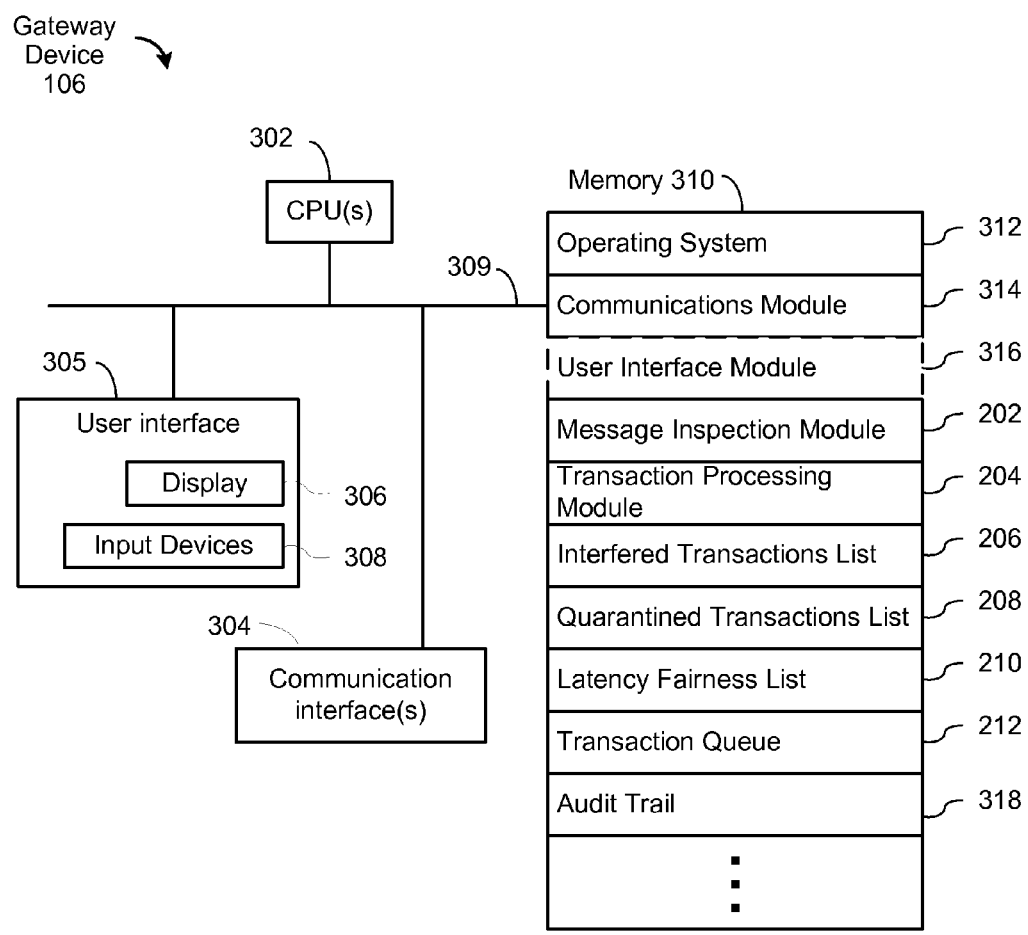
FIG. 3 is a block diagram illustrating a gateway device, according to some embodiments.

In some embodiments, (1) the data for the financial transactions included in message 230 and (2) timestamps corresponding to a time when the financial transactions were received are stored in an audit trail (e.g., audit trail 318 of FIG. 3).

In the example in FIG. 2A, message 230 includes a single financial transaction and transaction processing module 204 determines that the financial transaction included in message 230 involves a trading symbol 250. Transaction processing module 204 stores (1) the trading symbol 250 and (2) a timestamp corresponding to a time when the financial transaction involving the trading symbol 250 was received (e.g., a time when message 230 was received), in the interfered transactions list 206. In some embodiments, when a received, corrupted message 230 includes multiple financial transactions, transaction processing module 204 identifies the trading symbols corresponding to the financial transactions in message 230 and stores in the interfered transactions list 206 (1) the identified trading symbols and (2) a timestamp corresponding to the time when the corrupted message was received. Optionally, a separate timestamp is stored with each trading symbol stored in the interfered transaction list 206.

The interfered transactions list 206 includes information identifying financial instruments (e.g., trading symbols) that were involved in financial transactions included in messages that are deemed to have been corrupted. As discussed above, messages that have been corrupted may have been deliberately corrupted by a third party to increase the likelihood that financial transactions issued by the third party will be the first uncorrupted ones received by financial transaction servers 104. The interfered transactions list 206 provides a mechanism to remedy deliberate corruption of messages. In some embodiments, financial instruments in the interfered transactions list 206 are removed from the interfered transactions list 206 after a predetermined time interval (e.g., a time period between 100 milliseconds and 60 seconds). Note that the discussion of FIGS. 2B-2C assumes that the messages each include a single financial transaction. In instances where a received corrupted message includes recoverable information identifying multiple financial transactions, each financial transaction is processed individually as described herein.

In instances where message 230 is encrypted, transaction processing module 204 first decrypts message 230 before processing message 230 as described above. In some embodiments, financial transaction servers 104 provide gateway device 106 with decryption keys for decrypting messages directed to financial transaction servers 104. For example, financial transaction servers 104 may provide gateway device 106 with a private key of financial transaction servers 104 for decrypting messages encrypted using public-key encryption. In another example, financial transaction servers 104 may provide gateway device 106 with a session key (e.g., a symmetric session key) that is being used between financial transaction servers 104 and the sender of the message for decrypting messages encrypted using the session key. Note that the discussion of FIGS. 2B-2C assumes that the messages are not encrypted. In instances where these messages are encrypted, the process described above for decrypting the messages is used.

Figure 2B:
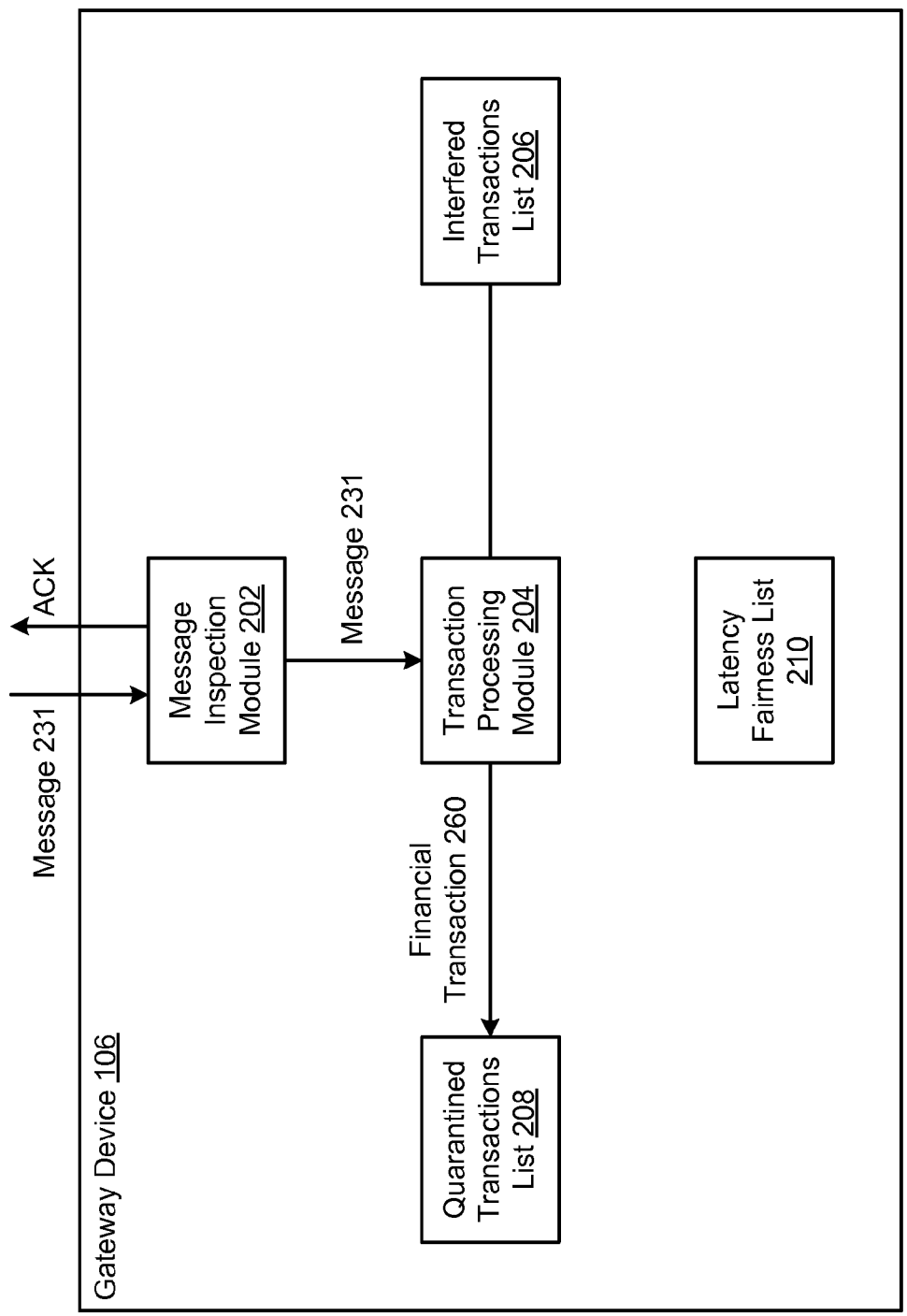
FIG. 2B is a block diagram illustrating a process of processing an uncorrupted message, according to some embodiments.

After message 230 is received, message inspection module 202 receives a message 231, as illustrated in FIG. 2B. The message inspection module 202 inspects message 231 and determines that message 231 is uncorrupted.

In some embodiments, after determining that message 231 is uncorrupted, message inspection module 202 transmits an acknowledgment (ACK) message to a sender of message 231 using the same protocol as the protocol that the sender of message 231 used to send message 231 to gateway device 106. The ACK message notifies the sender that message 231 was received without errors.

Message inspection module 202 then provides message 231 to transaction processing module 204. Again, transaction processing module 204 extracts data for at least one financial transaction (and typically, all financial transactions) included in message 231, as described above with reference to FIG. 2A. Since message 231 is uncorrupted, transaction processing module 204 then determines whether the at least one financial transaction (or, alternatively, each of the extracted financial transactions) included in message 231 involve financial instruments that are included in the interfered transactions list 206. In this example, message 231 includes a financial transaction 260 involving a financial instrument that is included in the interfered transactions list 206. For example, financial transaction 260 may involve a financial instrument corresponding to trading symbol 250. Transaction processing module 204 then stores (1) financial transaction 260 and (2) a timestamp corresponding to a time when financial transaction 260 was received, in the quarantined transactions list 208. The quarantined transactions list 208 includes financial transactions that are to be delayed because these financial transactions involve financial instruments that were included in prior messages that were deemed to have been corrupted. By delaying these financial transactions, any advantage that entities may have gained by corrupting messages of other entities is reduced.

In some embodiments, (1) the data for the financial transactions included in message 231 and (2) timestamps corresponding to a time when the financial transactions were received are stored in an audit trail (e.g., audit trail 318 of FIG. 3).

Figure 2C:
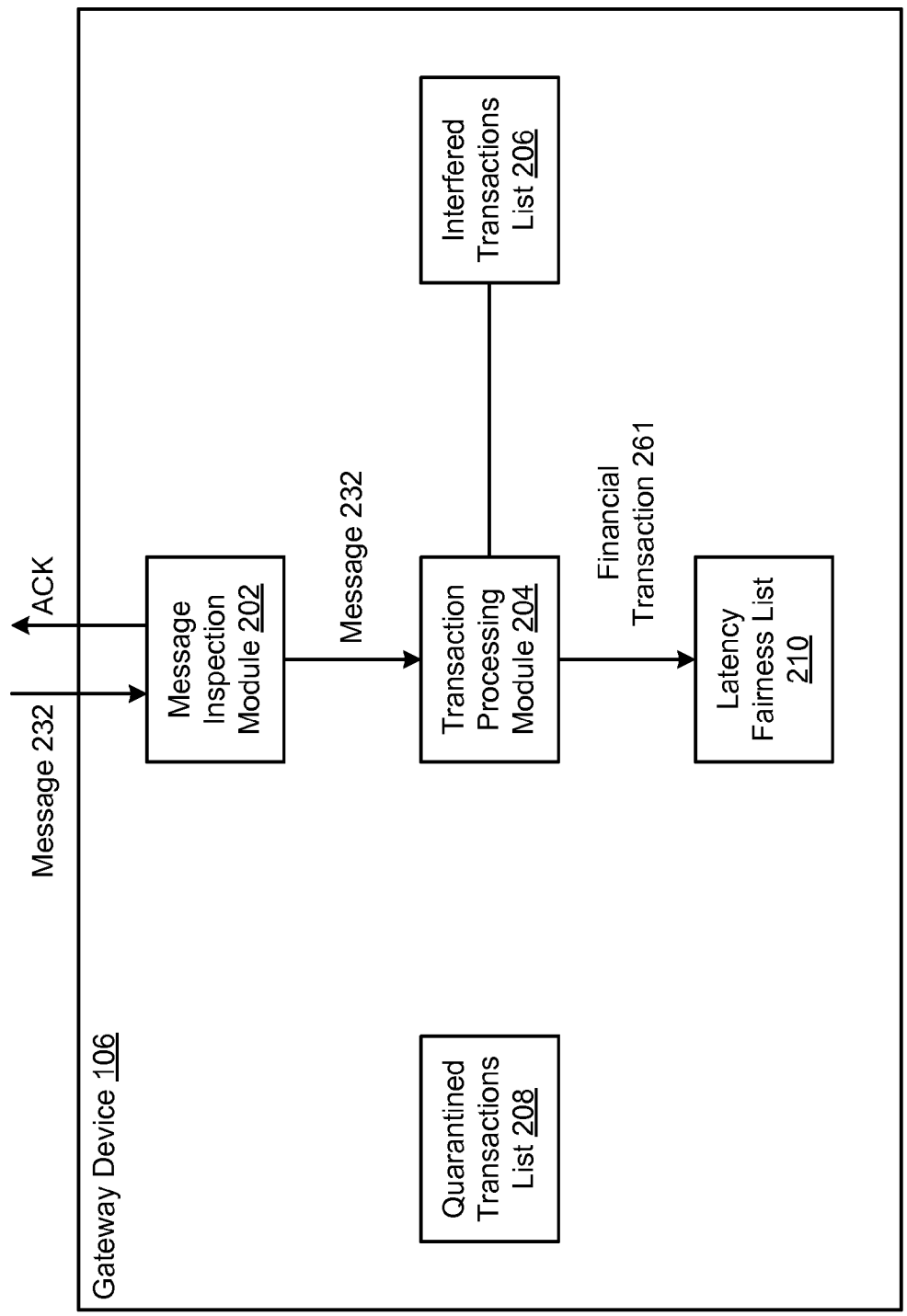
FIG. 2C is a block diagram illustrating another process of processing an uncorrupted message, according to some embodiments.

After message 230 is received, message inspection module 202 receives a message 232, as illustrated in FIG. 2C. Message 232 may be received either before or after message 231 is received. The message inspection module 202 inspects message 232 and determines that message 232 is uncorrupted.

In some embodiments, after determining that message 232 is uncorrupted, message inspection module 202 transmits an acknowledgment (ACK) message to a sender of message 232 using the same protocol as the protocol that the sender of message 232 used to send message 232 to gateway device 106. The ACK message notifies the sender that message 232 was received without errors.

The message inspection module 202 then provides message 232 to transaction processing module 204. Again, transaction processing module 204 extracts data for financial transactions included in message 232, as described above. Since message 232 is uncorrupted, transaction processing module 204 then determines whether the financial transactions included in message 232 involve financial instruments that are included in the interfered transactions list 206. In this example, message 232 includes a financial transaction 261 that does not involve financial instruments that are included in the interfered transactions list 206. Transaction processing module 204 then stores (1) financial transaction 261 and (2) a timestamp corresponding to a time when the financial transaction 20 was received, in the latency fairness list 210. As described below with reference to FIGS. 2E, 10, and 13, the latency fairness list 210 includes financial transactions that have not been processed (e.g., executed or fulfilled). The latency fairness list 210 is used to reduce or eliminate the low-latency advantage gained by traders that have access to third party servers 108 and/or traders that have access to the data center 102 via low latency network low latency network 123.

In some embodiments, (1) the data for the financial transactions included in message 232 and (2) timestamps corresponding to a time when the financial transactions were received are stored in an audit trail (e.g., audit trail 318 of FIG. 3).

Figure 2D:
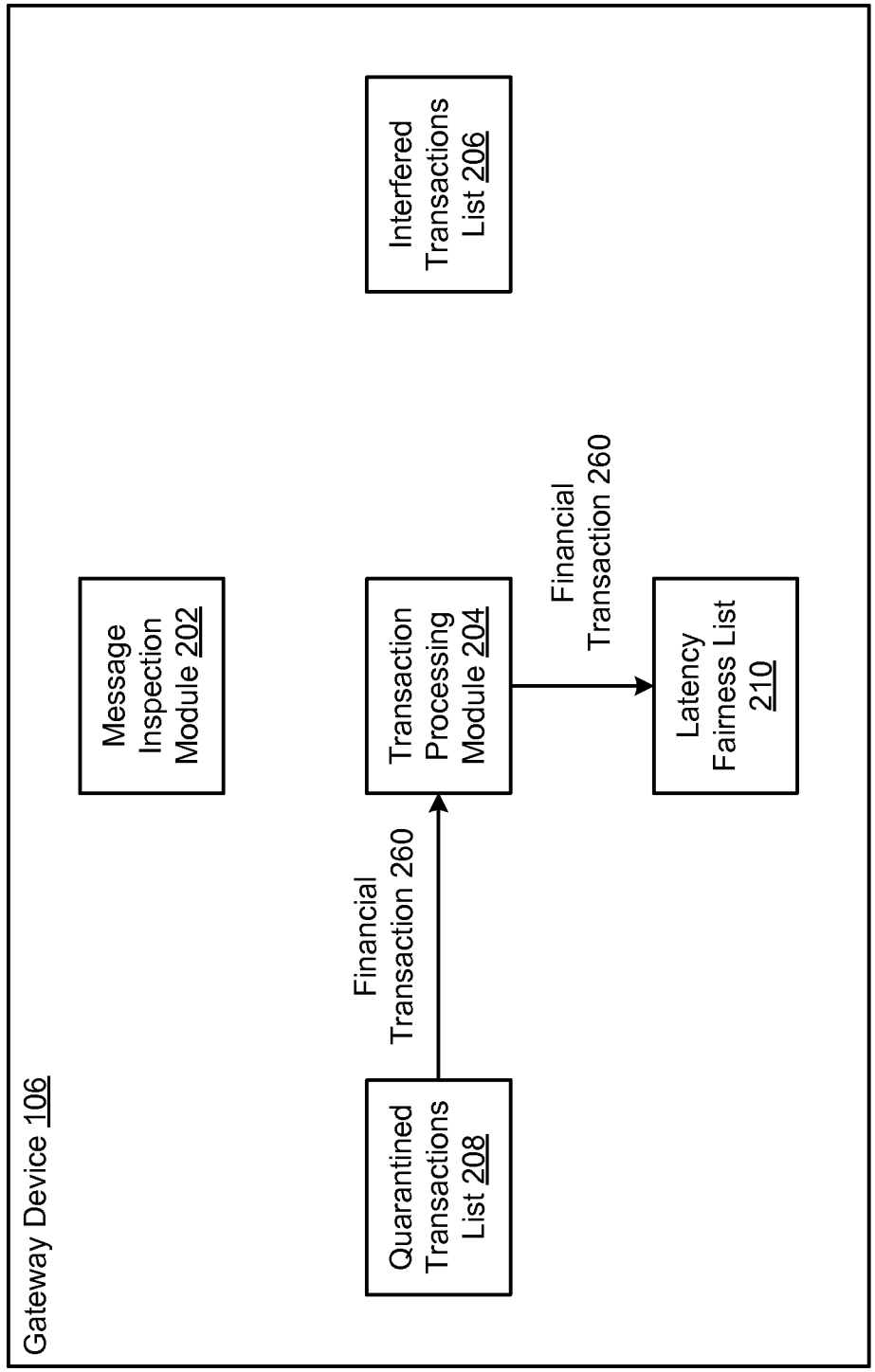
FIG. 2D is a block diagram illustrating a process of processing financial transactions in a quarantine transaction list, according to some embodiments.

After a predetermined time interval from the time when financial transaction 260 was placed in the quarantined transactions list 208 (as discussed above with reference to FIG. 2B), transaction processing module 204 removes financial transaction 260 from the quarantined transactions list 208 and stores (1) financial transaction 260 and (2) a timestamp corresponding to a time when financial transaction 260 was received, in the latency fairness list 210, as illustrated in FIG. 2D.

Figure 2E:
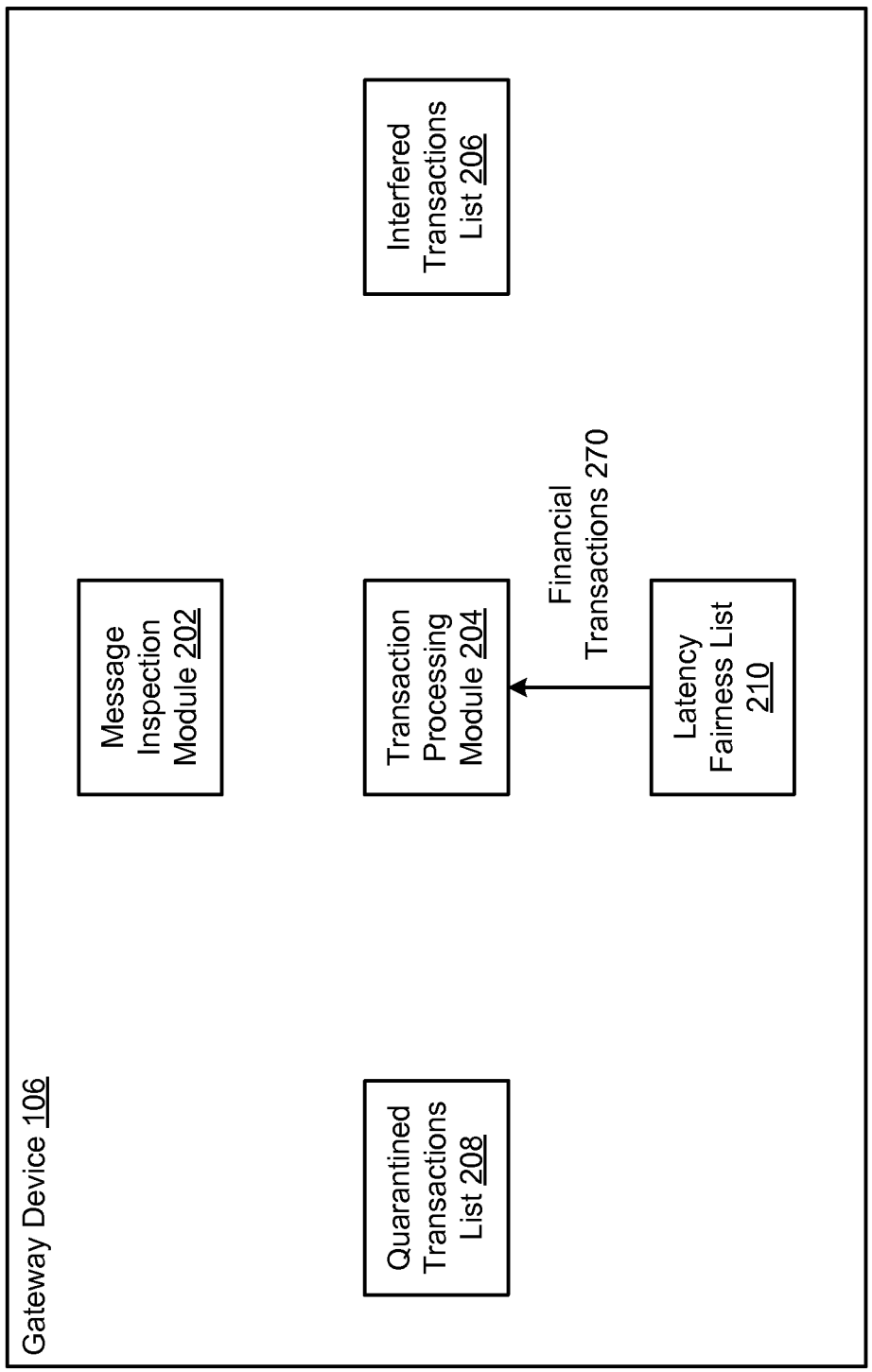
FIG. 2E is a block diagram illustrating a process of processing financial transactions in a latency fairness list, according to some embodiments.

In FIG. 2E, transaction processing module 204 obtains financial transactions 270 from the latency fairness list 210. The financial transactions 270 include financial transactions that have been in the latency fairness list 210 for at least a predetermined time interval. In some embodiments, the same predetermined time interval is applied to all financial transactions. In these embodiments, the actual latency between a respective sender of a message and financial transaction servers 104 is not determined. For example, assume that a first network latency time between a first sender and financial transaction servers 104 is 5 ms, a second network latency time between a second sender and financial transaction servers 104 is 100 ms, and that the predetermined time interval is 200 ms. Also assume that at t=0, a first message including financial transactions sent by the first sender and a second message including financial transactions sent by the second sender are sent to financial transaction servers 104. Thus, transaction processing module 204 receives the first message at t=5 ms and processes the financial transactions from the first sender at t=205 ms. Transaction processing module 204 receives the second message at t=100 ms and processes the financial transactions from the second sender at t=300 ms. Note that in these embodiments, the financial transactions from the first sender are still processed before financial transactions from the second sender.

In some embodiments, the predetermined time interval is based on the actual latency between a respective sender of a message and financial transaction servers 104. In these embodiments, the actual latency between senders of messages and financial transaction servers 104 is determined and used to identify financial transactions that have been in the latency fairness list 210 for the predetermined time interval. For example, assume that each sender is required to have at least 200 ms in network latency. This network latency time may be based on a maximum or an average network latency between senders and financial transaction servers 104. Continuing the example from above, transaction processing module 204 receives the first message at t=5 ms and processes the financial transactions from the first sender at t=200 ms (i.e., the predetermined time interval is 200 ms−5 ms=195 ms). Transaction processing module 204 receives the second message at t=100 ms and processes the financial transactions from the second sender at t=200 ms (i.e., the predetermined time interval is 200 ms−100 ms=100 ms). Note that in these embodiments, the financial transactions from the first sender and the second sender are both processed at t=200 ms.

After obtaining the financial transactions 270 from the latency fairness list 210, transaction processing module 204 determines an ordering of the financial transactions based on at least one ordering rule. In some embodiments, ordering rules include one or more of: a rule that orders financial transactions based on transaction type (e.g., buy orders, sell orders, etc.), a rule that orders financial transactions based on price (e.g., highest to lowest, lowest to highest, etc.), a rule that orders financial transactions based on financial quantities associated with the financial transactions or on quantity (e.g., volume) of a financial instrument that is being bought or sold, and a rule that orders financial transactions based on trading symbols.

Transaction processing module 204 then processes the financial transactions 270 based on the ordering. In some embodiments, transaction processing module 204 transmits the financial transactions 270 and the ordering of the financial transactions 270 to financial transaction servers 104 for execution in accordance with the ordering. The ordering may be an explicit ordering (e.g., the financial transactions 270 and an order in which the financial transactions 270 are to be executed is transmitted to financial transaction servers 104). Alternatively, the financial transactions 270 are sent to financial transaction servers 104 in the order that the financial transactions 270 are to be executed. Optionally, in some implementations, the ordered financial transactions to be sent to one or more of the financial transaction servers 104 are stored in a transaction queue 212, and then transmitted from transaction queue 212 to the one or more of the financial transaction servers 104.

In some embodiments, transaction processing module 204 executes the financial transactions 270 based on the ordering. For example, in some implementations, the functionality of gateway device 106 may be included in financial transaction servers 104. In those implementations, transaction processing module 204 may execute the financial transactions 270.

Optionally, in some implementations, as transactions are executed by the one or more of the financial transaction servers 104, the one or more of the financial transaction servers 104 send messages back to gateway device 106 identifying the executed transactions, and the executed transaction are removed from the transaction queue 212 in gateway device 106. Furthermore, in some implementations, transactions not executed by the one or more of the financial transaction servers 104 within an established time frame (e.g., one second, or a length time determined in accordance with the order flow rate), are discarded by the one or more of the financial transaction servers 104. Each such time frame is sometimes herein called a "time slice." The unexecuted transactions, if any, which are known to gateway device 106 because they remain in transaction queue 212, are then ordered along with newly received transactions in accordance with the aforementioned at least one ordering rule. The resulting newly ordered set of transactions, including any unexecuted transactions from prior time slices, are placed in transaction queue 212 are transmitted to the one or more of the financial transaction servers 104 for execution.

Gateway device 106 is described in more detail below with reference to FIGS. 7-13.

FIG. 3 is a block diagram illustrating a gateway device 106, according to some embodiments. Gateway device 106 typically includes one or more processing units 302 (sometimes called CPUs or processors) for executing programs (e.g., programs stored in memory 310), one or more network or other communications interfaces 304, memory 310, and one or more communication buses 309 for interconnecting these components. The communication buses 309 may include circuitry (sometimes called a chipset) that interconnects and controls communications between system components. Gateway device 106 optionally includes (but typically does not include) a user interface 305 comprising a display device 306 and input devices 308 (e.g., one or more of the following: keyboard, mouse, touch screen, keypad, etc.). Memory 310 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 310 optionally includes one or more storage devices remotely located from the CPU(s) 302. Memory 310, or alternately the non-volatile memory device(s) within memory 310, comprises a non-transitory computer readable storage medium. In some embodiments, memory 310 or the computer readable storage medium of memory 310 stores the following programs, modules and data structures, or a subset thereof:

- an operating system 312 that includes procedures for handling various basic system services and for performing hardware dependent tasks;
- a communication module 314 that is used for connecting gateway device 106 to other computers via the one or more communication interfaces 304 (wired or wireless) and one or more communication networks, such as the Internet, other wide area networks, local area networks, metropolitan area networks, and so on;
- an optional user interface module 316 that receives commands from the user via the input devices 308 and generates user interface objects in the display device 306;
- message inspection module 202, as described herein;
- transaction processing module 204, as described herein;
- the interfered transactions list 206, as described herein;
- the quarantined transactions list 208, as described here;
- the latency fairness list 210, as described herein; and
- an audit trail 318, as described herein.

In some embodiments, the programs or modules identified above correspond to sets of instructions for performing a function described above. The sets of instructions can be executed by one or more processors (e.g., the CPUs 302). The above identified modules or programs (i.e., sets of instructions) need not be implemented as separate software programs, procedures or modules, and thus various subsets of these programs or modules may be combined or otherwise re-arranged in various embodiments. In some embodiments, memory 310 stores a subset of the modules and data structures identified above. Furthermore, memory 310 may store additional modules and data structures not described above.

Although FIG. 3 shows a "gateway device," FIG. 3 is intended more as functional description of the various features which may be present in a set of gateway devices than as a structural schematic of the embodiments described herein. In practice, and as recognized by those of ordinary skill in the art, items shown separately could be combined and some items could be separated. For example, some items shown separately in FIG. 3 could be implemented on single gateway devices and single items could be implemented by one or more gateway devices. The actual number of devices used to implement a gateway device and how features are allocated among them will vary from one implementation to another, and may depend in part on the amount of data traffic that the system must handle during peak usage periods as well as during average usage periods.

Figure 4:
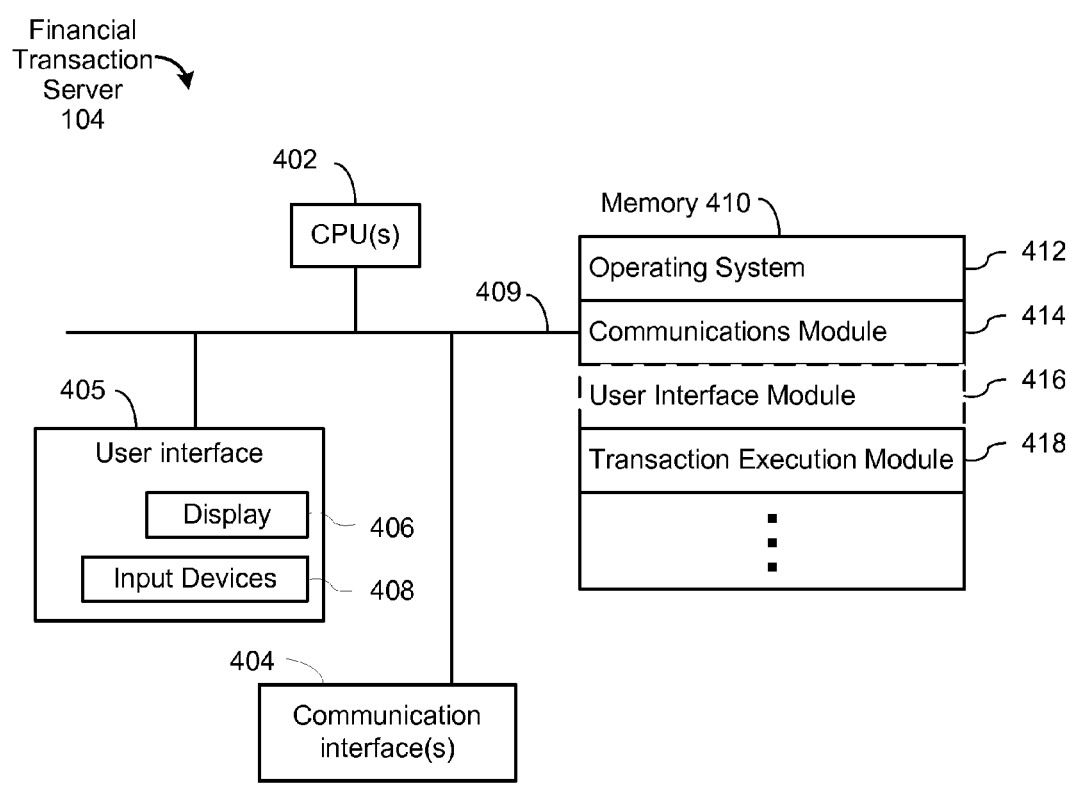
FIG. 4 is a block diagram illustrating a financial transaction server system, according to some embodiments.

FIG. 4 is a block diagram illustrating the financial transaction server 104, according to some embodiments. The financial transaction server 104 typically includes one or more processing units 402 (sometimes called processors or CPUs) for executing programs (e.g., programs stored in memory 410), one or more network or other communications interfaces 404, memory 410, and one or more communication buses 409 for interconnecting these components. The communication buses 409 may include circuitry (sometimes called a chipset) that interconnects and controls communications between system components. The financial transaction server 104 optionally includes (but typically does not include) a user interface 405 comprising a display device 406 and input devices 408 (e.g., keyboard, mouse, touch screen, keypads, etc.). Memory 410 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 410 optionally includes one or more storage devices remotely located from the CPU(s) 402. Memory 410, or alternately the non-volatile memory device(s) within memory 410, comprises a non-transitory computer readable storage medium. In some embodiments, memory 410 or the computer readable storage medium of memory 410 stores the following programs, modules and data structures, or a subset thereof:

- an operating system 412 that includes procedures for handling various basic system services and for performing hardware dependent tasks;
- a communication module 414 that is used for connecting the financial transaction server 104 to other computers via the one or more communication interfaces 404 (wired or wireless) and one or more communication networks, such as the Internet, other wide area networks, local area networks, metropolitan area networks, and so on;
- an optional user interface module 416 that receives commands from the user via the input devices 408 and generates user interface objects in the display device 406; and
- a transaction execution module to execute (fulfill) financial transactions received from the third party servers 108 and/or 110.

In some embodiments, the programs or modules identified above correspond to sets of instructions for performing a function described above. The sets of instructions can be executed by one or more processors (e.g., the CPUs 402). The above identified modules or programs (i.e., sets of instructions) need not be implemented as separate software programs, procedures or modules, and thus various subsets of these programs or modules may be combined or otherwise re-arranged in various embodiments. In some embodiments, memory 410 stores a subset of the modules and data structures identified above. Furthermore, memory 410 may store additional modules and data structures not described above.

Although FIG. 4 shows a "financial transaction server," FIG. 4 is intended more as functional description of the various features which may be present in a set of financial transaction servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement a financial transaction server and how features are allocated among them will vary from one implementation to another, and may depend in part on the amount of data traffic that the system must handle during peak usage periods as well as during average usage periods.

Figure 5:
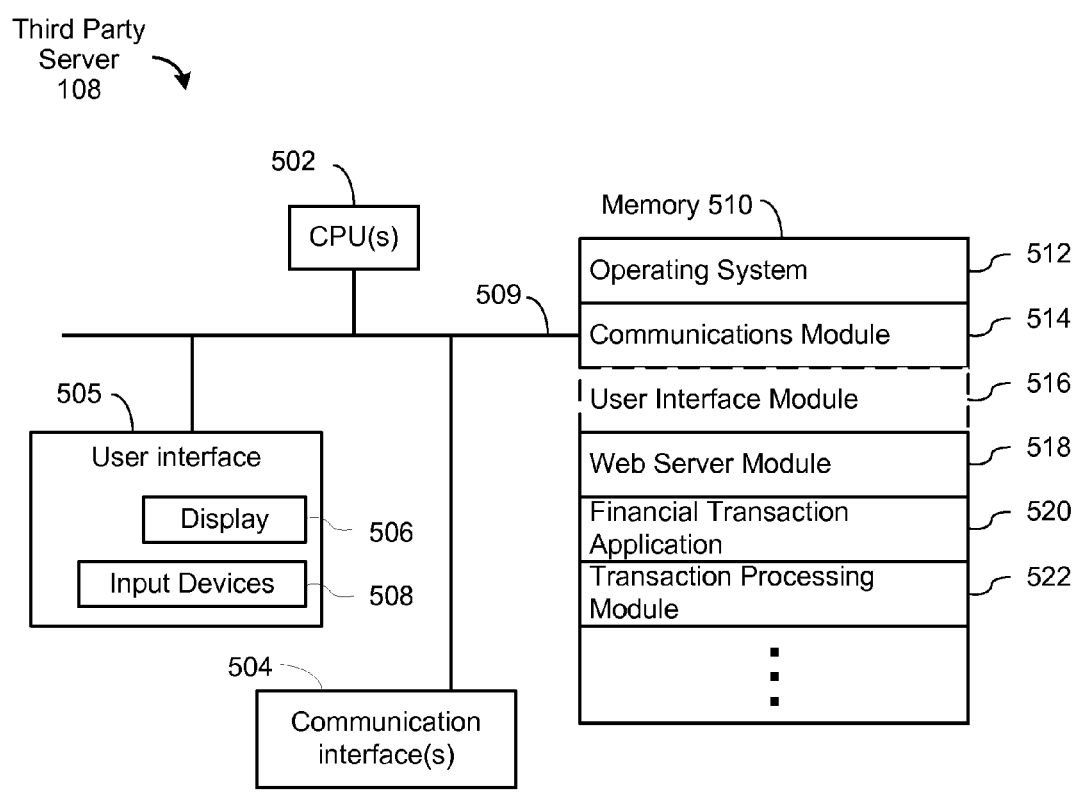
FIG. 5 is a block diagram illustrating a third party server system, according to some embodiments.

FIG. 5 is a block diagram illustrating the third party server 108, according to some embodiments. Note that the third party server 110 includes similar elements as the third party servers 108. Thus, the following discussion of the third party server 108 applies to the third party server 110. The third party server 108 typically includes one or more processing units 502 (sometimes called processors or CPUs) 502 for executing programs (e.g., programs stored in memory 510), one or more network or other communications interfaces 504, memory 510, and one or more communication buses 509 for interconnecting these components. The communication buses 509 may include circuitry (sometimes called a chipset) that interconnects and controls communications between system components. The third party server 108 optionally includes (but typically does not include) a user interface 505 comprising a display device 506 and input devices 508 (e.g., keyboard, mouse, touch screen, keypads, etc.). Memory 510 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 510 optionally includes one or more storage devices remotely located from the CPU(s) 502. Memory 510, or alternately the non-volatile memory device(s) within memory 510, comprises a non-transitory computer readable storage medium. In some embodiments, memory 510 or the computer readable storage medium of memory 510 stores the following programs, modules and data structures, or a subset thereof:

- an operating system 512 that includes procedures for handling various basic system services and for performing hardware dependent tasks;
- a communication module 514 that is used for connecting the third party server 108 to other computers via the one or more communication interfaces 504 (wired or wireless) and one or more communication networks, such as the Internet, other wide area networks, local area networks, metropolitan area networks, and so on;
- an optional user interface module 516 that receives commands from the user via the input devices 508 and generates user interface objects in the display device 506;
- a web server module 518 that responds to requests from clients to access documents and/or applications hosted on the third party server 108;
- a financial transaction application 520 that provides a user interface for users to receive data on financial instruments and to submit financial transactions to financial transaction servers 104, and/or that programmatically (e.g., without human interaction) generates financial transactions based on data received for financial instruments; and
- a transaction processing module 522 that issues financial transactions to financial transaction servers 104.

In some embodiments, the programs or modules identified above correspond to sets of instructions for performing a function described above. The sets of instructions can be executed by one or more processors (e.g., the CPUs 502). The above identified modules or programs (i.e., sets of instructions) need not be implemented as separate software programs, procedures or modules, and thus various subsets of these programs or modules may be combined or otherwise re-arranged in various embodiments. In some embodiments, memory 510 stores a subset of the modules and data structures identified above. Furthermore, memory 510 may store additional modules and data structures not described above.

Although FIG. 5 shows a "third party server," FIG. 5 is intended more as functional description of the various features which may be present in a set of third party servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement a third party server and how features are allocated among them will vary from one implementation to another, and may depend in part on the amount of data traffic that the system must handle during peak usage periods as well as during average usage periods.

Figure 6:
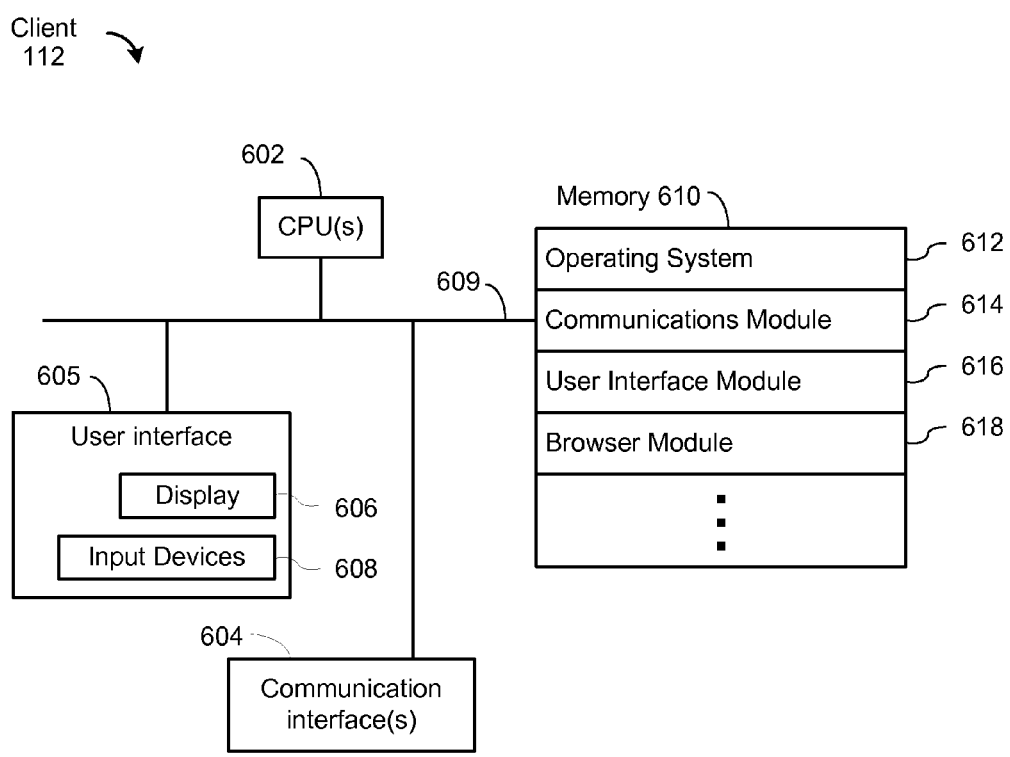
FIG. 6 is a block diagram illustrating a client system or device, according to some embodiments.

FIG. 6 is a block diagram illustrating the client 112, according to some embodiments. The client 112 typically includes one or more processing units 602 (sometimes called processors or CPUs) for executing programs (e.g., programs stored in memory 610), one or more network or other communications interfaces 604, memory 610, and one or more communication buses 609 for interconnecting these components. The communication buses 609 may include circuitry (sometimes called a chipset) that interconnects and controls communications between system components. The client 112 includes a user interface 605 comprising a display device 606 and input devices 608 (e.g., one or more of the following: keyboard, mouse, touch screen, keypads, etc.). Memory 610 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 610 optionally includes one or more storage devices remotely located from the CPU(s) 602. Memory 610, or alternately the non-volatile memory device(s) within memory 610, comprises a non-transitory computer readable storage medium. In some embodiments, memory 610 or the computer readable storage medium of memory 610 stores the following programs, modules and data structures, or a subset thereof:
- an operating system 612 that includes procedures for handling various basic system services and for performing hardware dependent tasks;
- a communication module 614 that is used for connecting the client 112 to other computers via the one or more communication interfaces 604 (wired or wireless) and one or more communication networks, such as the Internet, other wide area networks, local area networks, metropolitan area networks, and so on;
- a user interface module 616 that receives commands from the user via the input devices 608 and generates user interface objects in the display device 606; and
- a browser module 618 that provides a user interface for users to view and/or interact with documents and/or applications hosted on servers (e.g., the third party servers 108 and/or 110).

In some embodiments, the programs or modules identified above correspond to sets of instructions for performing a function described above. The sets of instructions can be executed by one or more processors (e.g., the CPUs 602). The above identified modules or programs (i.e., sets of instructions) need not be implemented as separate software programs, procedures or modules, and thus various subsets of these programs or modules may be combined or otherwise re-arranged in various embodiments. In some embodiments, memory 610 stores a subset of the modules and data structures identified above. Furthermore, memory 610 may store additional modules and data structures not described above.

Although FIG. 6 shows a "client," FIG. 6 is intended more as functional description of the various features which may be present in a client than as a structural schematic of the embodiments described herein. In practice, and as recognized by those of ordinary skill in the art, items shown separately could be combined and some items could be separated.

Delaying Execution of Financial Transactions

Figure 7:
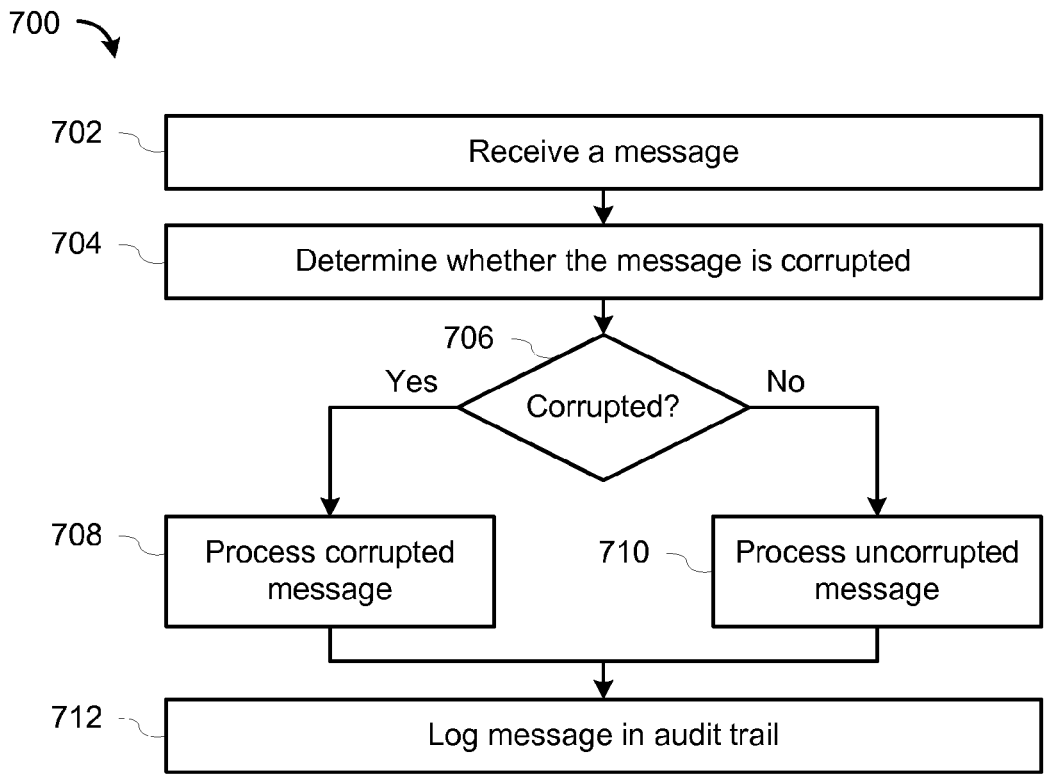
FIG. 7 is a flowchart of a method for processing messages, according to some embodiments.

FIG. 7 is a flowchart of a method 700 for processing messages, according to some embodiments. The message inspection module 202 receives (702) a message. Transaction processing module 204 determines (704) whether the message is corrupted. As discussed above, in some embodiments, the message is deemed to be corrupted if at least one packet in the message is corrupted. In response to determining that the message is corrupted (706, yes), transaction processing module 204 processes (708) the corrupted message.

In response to determining that the message is not corrupted (706, no), transaction processing module 204 processes (710) the uncorrupted message. Typically, after determining that the message is uncorrupted, message inspection module 202 transmits an acknowledgment to a sender of the first message notifying the sender that the first message was received without errors. The acknowledgement is typically transmitted using a same protocol as a protocol that was used to send the first message to the server.

Operations 708 and 710 are described in more detail below with reference to FIGS. 8-13.

In some embodiments, transaction processing module 204 logs (712) the message in an audit trail, as discussed above.

Figure 8:
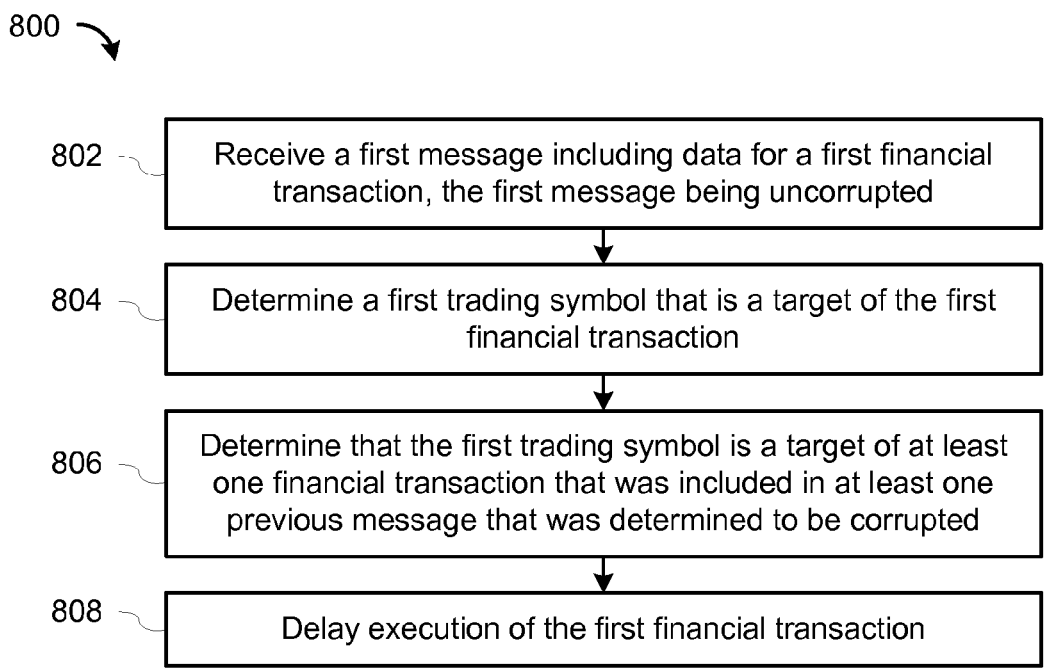
FIG. 8 is a flowchart of a method for delaying execution of financial transactions that were included in corrupted messages, according to some embodiments.

FIG. 8 is a flowchart of a method 800 for delaying execution of financial transactions that were included in corrupted messages, according to some embodiments. Transaction processing module 204 receives (802) a first message including data for a first financial transaction, where the first message is uncorrupted. As discussed above, the first message may include multiple financial transactions. Furthermore, the first message may be composed of one or more packets. In some implementations, when the first message is composed of one or more packets, the first message is deemed to be corrupted when at least one packet for the message is corrupted. Note that a message may be deemed to be corrupted when the message is determined to meet predefined indicia of tampering. For example, a message may be deemed to be corrupted when a checksum for the transmitted message (e.g., a checksum calculated and sent by the sender) does not match a checksum for the received message (e.g. a checksum calculated by the receiver). In another example, a message may be deemed to be corrupted when parity bits in the message do not correspond to a parity of the received message. In some implementations, when one or more packets of a multiple packet message are corrupted, the packets that are corrupted are retransmitted by the sender when a NACK signal is received by the sender. The multi-packet message is marked as corrupted and the financial transactions included in the message are added to the interfered transaction list 206. Optionally, if the transaction processing module 204 receives uncorrupted versions of corrupted packets (i.e., retransmitted packets corresponding to the corrupted packets), the transaction processing module 204 processes the message as if it were uncorrupted. In some implementations, if the transaction processing module 204 does not receive uncorrupted version of the corrupted packets, the transaction processing module 204 discards the multi-packet message.

In some embodiments, the data for the first financial transaction is encrypted. In these embodiments, prior to determining the first trading symbol that is the target of the first financial transaction, transaction processing module 204 decrypts the data for the first financial transaction.

It is noted that although the following discussion refers to a "trading symbol," in general, the methods described herein are applicable to financial transactions involving any financial instrument. Transaction processing module 204 determines (804) a first trading symbol that is a target of the first financial transaction (for which data was included in the received first message).

Transaction processing module 204 determines (806) that the first trading symbol is a target of at least one financial transaction that was included in at least one previous message that was determined to be corrupted. Note that the process of handling a message that is deemed to be corrupted is described in more detail with reference to FIG. 11.

In some embodiments, determining (806) that the first trading symbol was the target of the at least one previous financial transaction that was included in the at least one previous message that was determined to be corrupted, includes determining that the first trading symbol is included in the interfered transactions list 206. The interfered transactions list 206 includes indicia of trading symbols that were targets of financial transactions that were included in messages determined to be corrupt. In some embodiments, the transaction processing module 204 periodically removes the indicia of trading symbols that were targets of financial transactions that were included in messages determined to be corrupt. For example, the transaction processing module 204 may remove the first trading symbol from the interfered transaction list 206 after the first trading symbol has been in the interfered transaction list for at least a predetermined time period (e.g., after a predetermined time period of 100 milliseconds to 60 seconds).

Upon making the aforementioned determination (in operation 806), transaction processing module 204 delays (808) execution of the first financial transaction. Operation 808 is described in more detail below with reference to FIG. 9.

Note that the discussion of FIG. 8 refers to a "first message" and a "first trading symbol." However, the operations described with reference to FIG. 8 may be applied to any number of trading symbols that are included in any number of messages.

Figure 9:
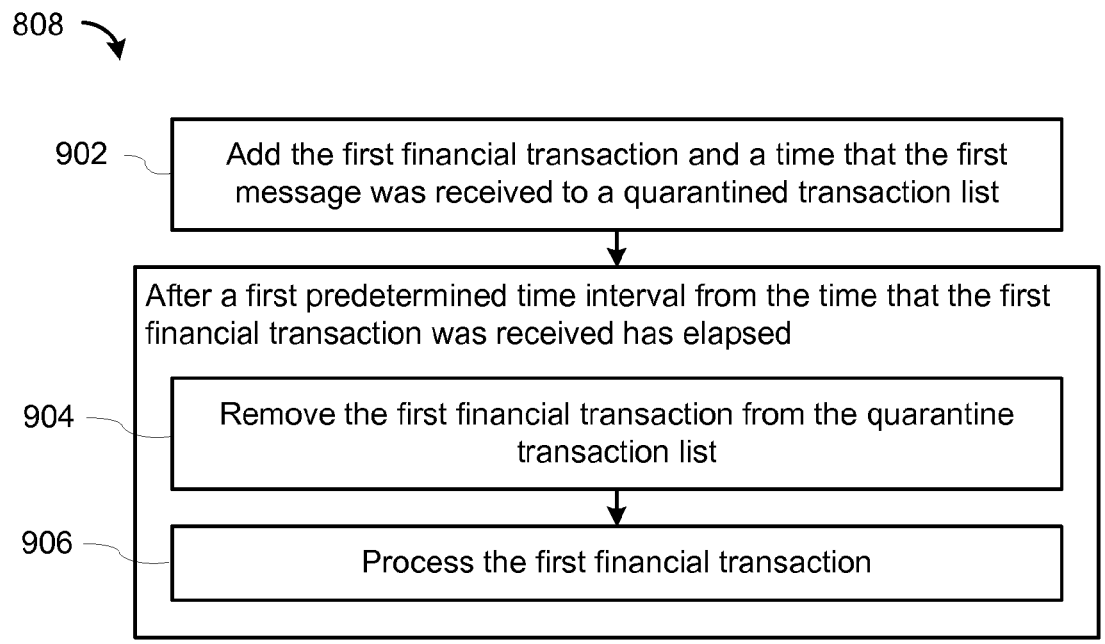
FIG. 9 is a flowchart of a method for delaying execution of a financial transaction that is associated with financial transactions included in corrupted messages, according to some embodiments.

FIG. 9 is a flowchart of a method for delaying (808) execution of a financial transaction that is associated with financial transactions included in corrupted messages, according to some embodiments. Transaction processing module 204 adds (902) the first financial transaction and a time that the first message was received (and any other financial transaction included in the first message), to the quarantined transactions list 208.

After a first predetermined time interval from the time that the first financial transaction was received has elapsed, transaction processing module 204 removes (904) the first financial transaction from the quarantine transaction list and processes (906) the first financial transaction.

Transaction processing module 204 may process the first financial transaction in several ways. In implementations where the functionality of gateway device 106 is included in financial transaction servers 104, when processing (906) the first financial transaction, transaction processing module 204 executes the first financial transaction.

In implementations where gateway device 106 is separate and distinct from financial transaction servers 104, when processing (906) the first financial transaction, transaction processing module 204 transmits the first financial transaction to financial transaction servers 104 for execution.

Figure 10:
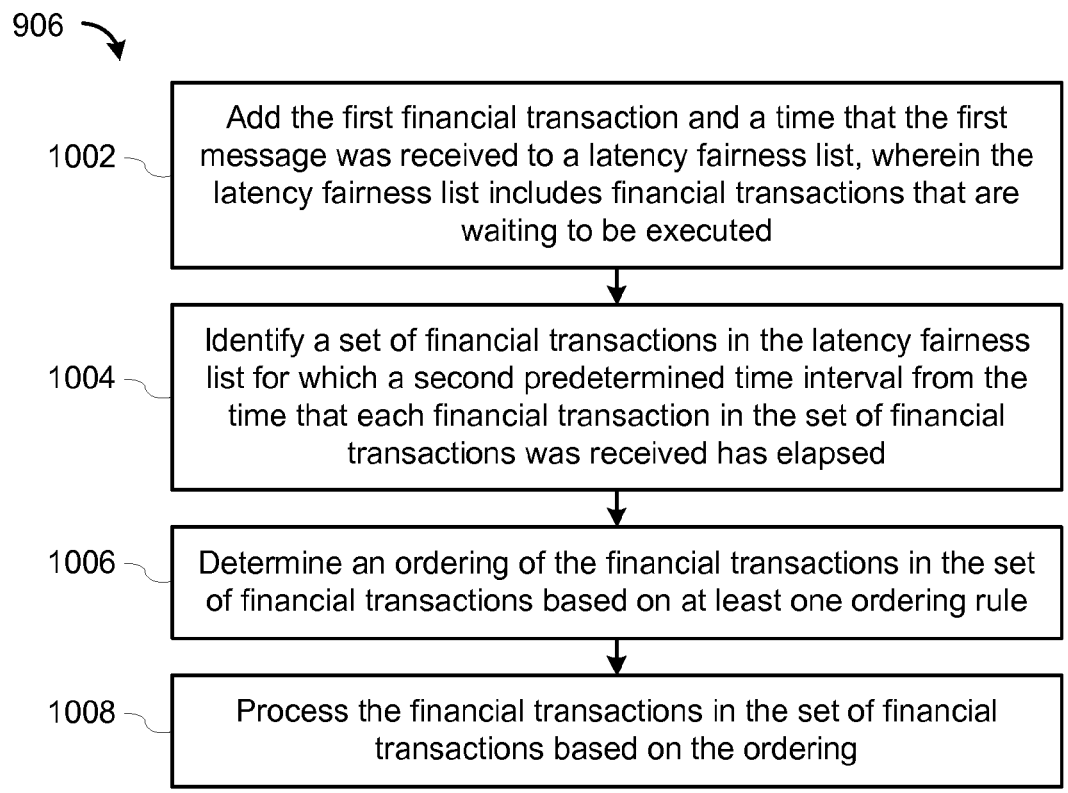
FIG. 10 is a flowchart of a method for processing a financial transaction based on a network latency between a sender of the message including the financial transaction and a financial transaction server, according to some embodiments.

In some embodiments, when processing (906) the first financial transaction, financial transaction servers 104 account for the network latency between a sender of the message including the first financial transaction and financial transaction servers 104. FIG. 10 is a flowchart of an example method for processing (906) a financial transaction based on the network latency between the sender of the message including the first financial transaction and financial transaction servers 104, according to some embodiments. Transaction processing module 204 adds (1002) the first financial transaction and a time that the first message was received to the latency fairness list 210. As discussed above, the latency fairness list 210 includes financial transactions that are waiting to be executed.

Transaction processing module 204 then identifies (1004) a set of financial transactions (e.g., the financial transactions 270) in the latency fairness list 210 for which a second predetermined time interval from the time that each financial transaction in the set of financial transactions was received has elapsed, wherein the set of financial transactions includes the first financial transaction. The discussion above with reference to FIG. 2E provides an example of identifying a set of financial transactions in the latency fairness list 210 for which a second predetermined time interval from the time that each financial transaction in the set of financial transactions was received has elapsed.

Transaction processing module 204 determines (1006) an ordering of the financial transactions in the set of financial transactions based on at least one ordering rule. In some embodiments, the at least one ordering rule includes one or more of a rule that orders financial transactions based on transaction type, a rule that orders financial transactions based on price, a rule that orders financial transactions based on a financial quantities associated with the financial transactions or on quantity (e.g., volume) of the financial instruments involved in the financial transactions, and a rule that orders financial transactions based on trading symbols. For example, transaction processing module 204 may order the financial transactions in the set of financial transactions by both the transaction type (e.g., buy order, sell order, etc.) and a quantity of the financial instruments or a financial quantity involved in the financial transactions.

Transaction processing module 204 then processes (1008) the financial transactions in the set of financial transactions based on the ordering. In implementations where the functionality of gateway device 106 is included in financial transaction servers 104, when processing (1008) the financial transactions in the set of financial transactions based on the ordering, transaction processing module 204 executes financial transactions in the set of financial transactions based on the ordering.

In implementations where gateway device 106 is separate and distinct from financial transaction servers 104, when processing (1008) the financial transactions in the set of financial transactions based on the ordering, transaction processing module 204 sends the set of financial transactions to financial transaction servers 104 for execution in accordance with the ordering. As discussed above, the ordering may be an explicit ordering (e.g., the set of financial transactions and an order in which the financial transactions in the set of financial transactions are to be executed are transmitted to financial transaction servers 104). Alternatively, the set of financial transactions are sent to financial transaction servers 104 in the order that the financial transactions in the set of financial transactions are to be executed.

Figure 11:
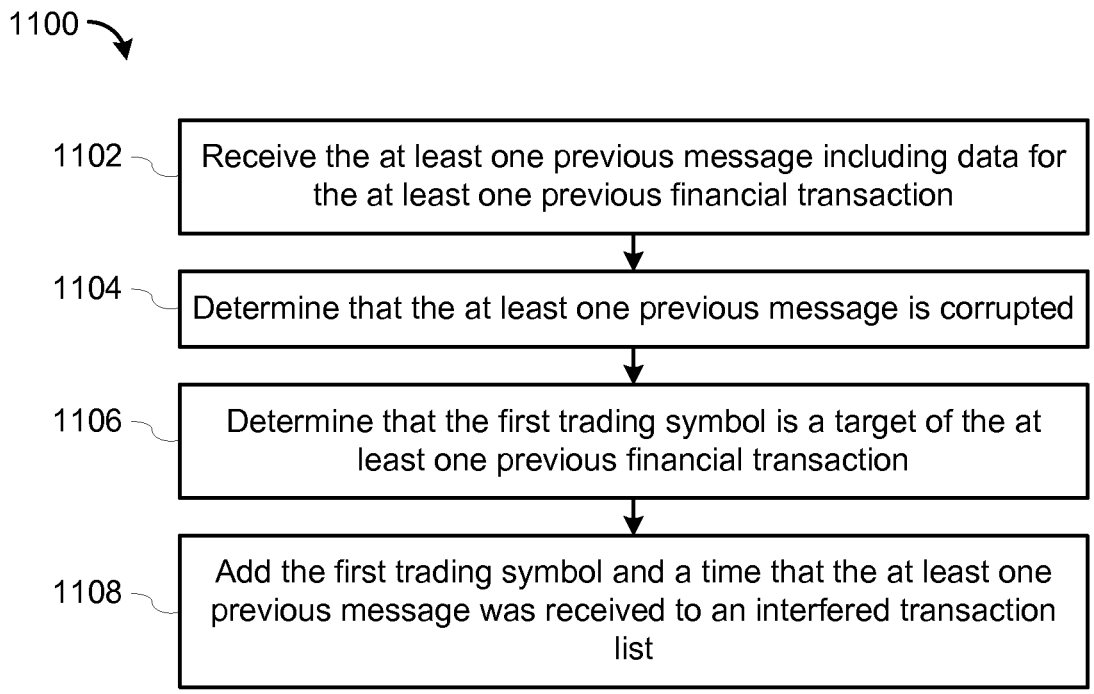
FIG. 11 is a flowchart of a method for processing corrupted messages, according to some embodiments.

FIG. 11 is a flowchart of a method 1100 for processing corrupted messages, according to some embodiments. Prior to receiving (802) the first message, transaction processing module 204 (of gateway device 106) receives (1102) at least one previous message including data for the at least one previous financial transaction, and determines (1104) that the at least one previous message is corrupted (e.g., using checksums, using parity bits, etc.). Transaction processing module 204 furthermore determines (1106) that the first trading symbol is a target of the at least one previous financial transaction (i.e., a corrupted financial transaction). Transaction processing module 204 then adds (1108) the first trading symbol and a time that the at least one previous message was received to the interfered transactions list 206. In summary, the operations of FIG. 11 add trading symbols that were included in corrupted messages to the interfered transactions list 206.

In some embodiments, in conjunction with operation 1104, message inspection module 202 transmits an negative acknowledgment (NACK) to a sender of the at least one previous message notifying the sender that the at least one previous message was received with errors, wherein the negative acknowledgement is transmitted using a same protocol as a protocol that was used to send the at least one previous message to the server. As discussed above, message inspection module 202 may transmit the negative acknowledgment to the sender after determining that the packet is corrupted.

Figure 12:
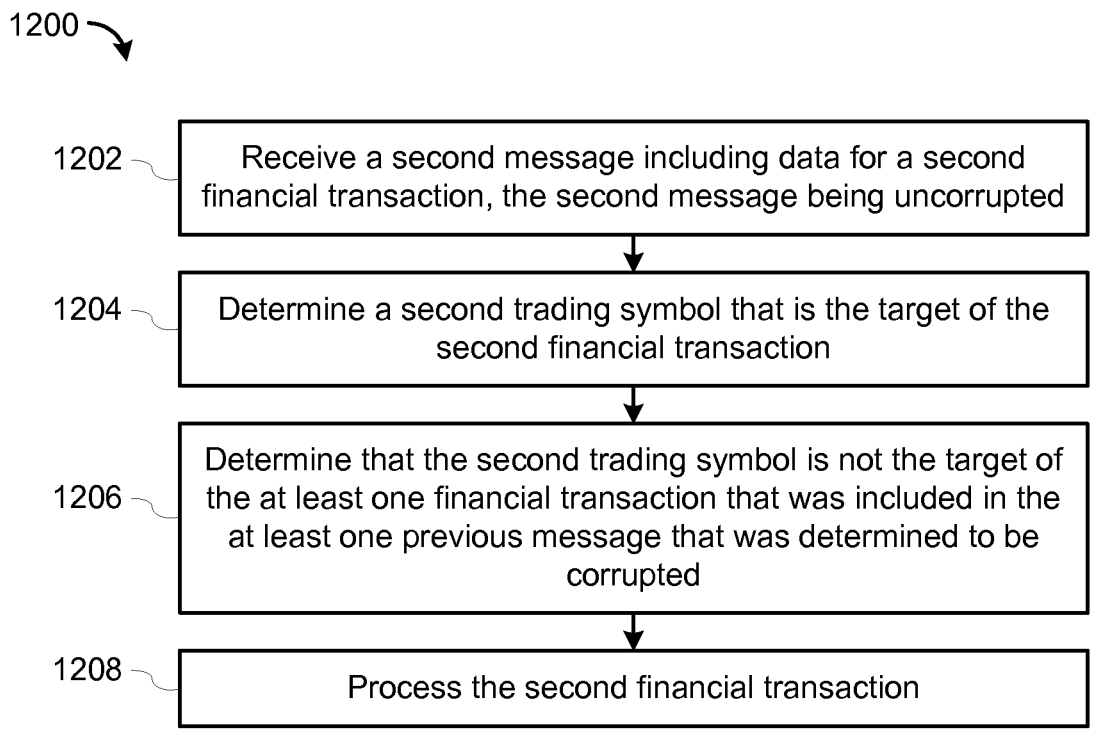
FIG. 12 is a flowchart of a method for processing financial transactions that are not associated with financial transactions included in corrupted messages, according to some embodiments.

FIG. 12 is a flowchart of a method 1200 for processing financial transactions that are not associated with financial transactions included in corrupted messages, according to some embodiments. Transaction processing module 204 (of gateway device 106) receives (1202) a second message including data for a second financial transaction, where the second message is uncorrupted.

In some embodiments, the data for the second financial transaction is encrypted. In these embodiments, prior to determining the second trading symbol that is the target of the second financial transaction, transaction processing module 204 decrypts the data for the second financial transaction (e.g., as discussed above with reference to FIG. 2A).

Transaction processing module 204 then determines (1204) a trading symbol (herein called the second trading symbol) that is the target of the second financial transaction.

Transaction processing module 204 determines (1206) that the second trading symbol is not the target of the at least one financial transaction that was included in the at least one previous message that was determined to be corrupted. In accordance with that determination, transaction processing module 204 then processes (1208) the second financial transaction.

As discussed above, transaction processing module 204 may process the second financial transaction in several ways. In implementations where the functionality of gateway device 106 is included in financial transaction servers 104, when processing the second financial transaction, transaction processing module 204 executes the second financial transaction.

In implementations where gateway device 106 is separate and distinct from financial transaction servers 104, when processing the second financial transaction, transaction processing module 204 transmits the second financial transaction to financial transaction servers 104 for execution.

In some embodiments, in conjunction with receiving the second message and determining that it is uncorrupted (see operation 1202), message inspection module 202 transmits an acknowledgment to a sender of the second message notifying the sender that the second message was received without errors, wherein the acknowledgement is transmitted using a same protocol as a protocol that was used to send the second message to the server. As discussed above, message inspection module 202 may transmit the acknowledgment to the sender after determining that the message is uncorrupted.

Figure 13:
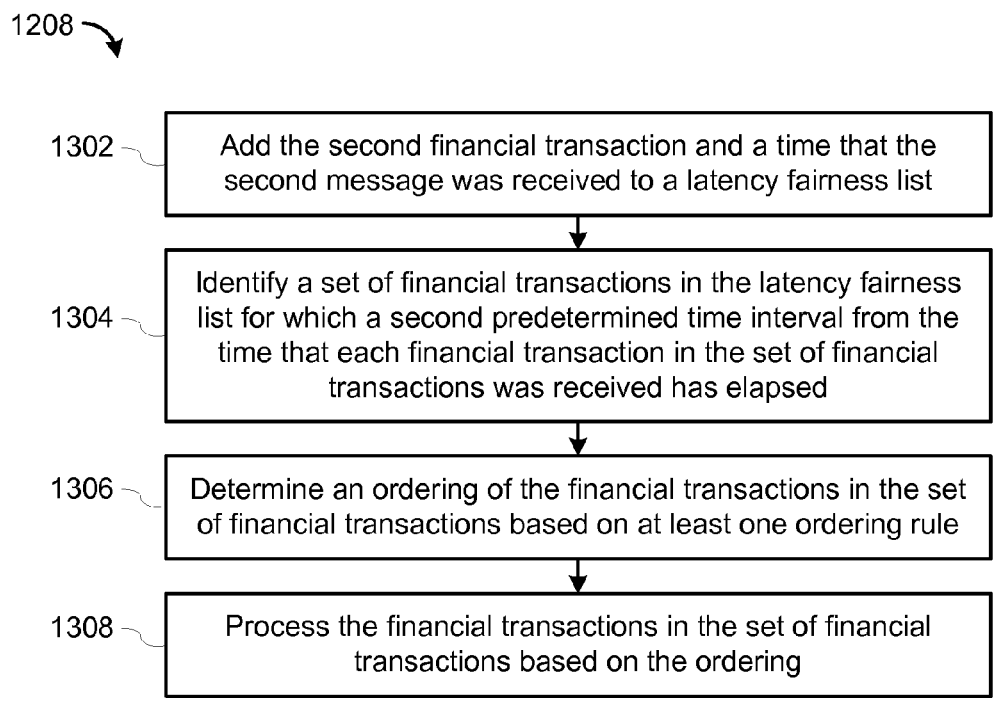
FIG. 13 is a flowchart of a method for processing a financial transaction that is not associated with financial transactions included in corrupted messages, according to some embodiments.

In some embodiments, when processing (1208) the second financial transaction, financial transaction servers 104 account for the network latency between a sender of the message including the second financial transaction and financial transaction servers 104. FIG. 13 is a flowchart of a method for processing (1208) the second financial transaction, according to some embodiments.

Transaction processing module 204 adds (1302) the second financial transaction and a time that the second message was received to the latency fairness list 210.

Transaction processing module 204 then identifies (1304) a set of financial transactions in the latency fairness list 210 for which a second predetermined time interval (e.g., the predetermined time interval discussed with reference to FIG. 2E) from the time that each financial transaction in the set of financial transactions was received has elapsed, wherein the set of financial transactions includes the second financial transaction.

Transaction processing module 204 determines (1306) an ordering of the financial transactions in the set of financial transactions based on at least one ordering rule (e.g., the ordering rules discussed above with reference to FIGS. 2E and 10).

Transaction processing module 204 then processes (1308) the financial transactions in the set of financial transactions based on the ordering. In implementations where the functionality of gateway device 106 is included in financial transaction servers 104, when processing the financial transactions in the set of financial transactions based on the ordering, transaction processing module 204 executes financial transactions in the set of financial transactions based on the ordering.

In implementations where gateway device 106 is separate and distinct from financial transaction servers 104, when processing the financial transactions in the set of financial transactions based on the ordering, transaction processing module 204 sends the set of financial transactions to financial transaction servers 104 for execution in accordance with the ordering. As discussed above, the ordering may be an explicit ordering (e.g., the set of financial transactions and an order in which the financial transactions in the set of financial transactions are to be executed are transmitted to financial transaction servers 104). Alternatively, the set of financial transactions are sent to financial transaction servers 104 in the order that the financial transactions in the set of financial transactions are to be executed.

Figure 14A:
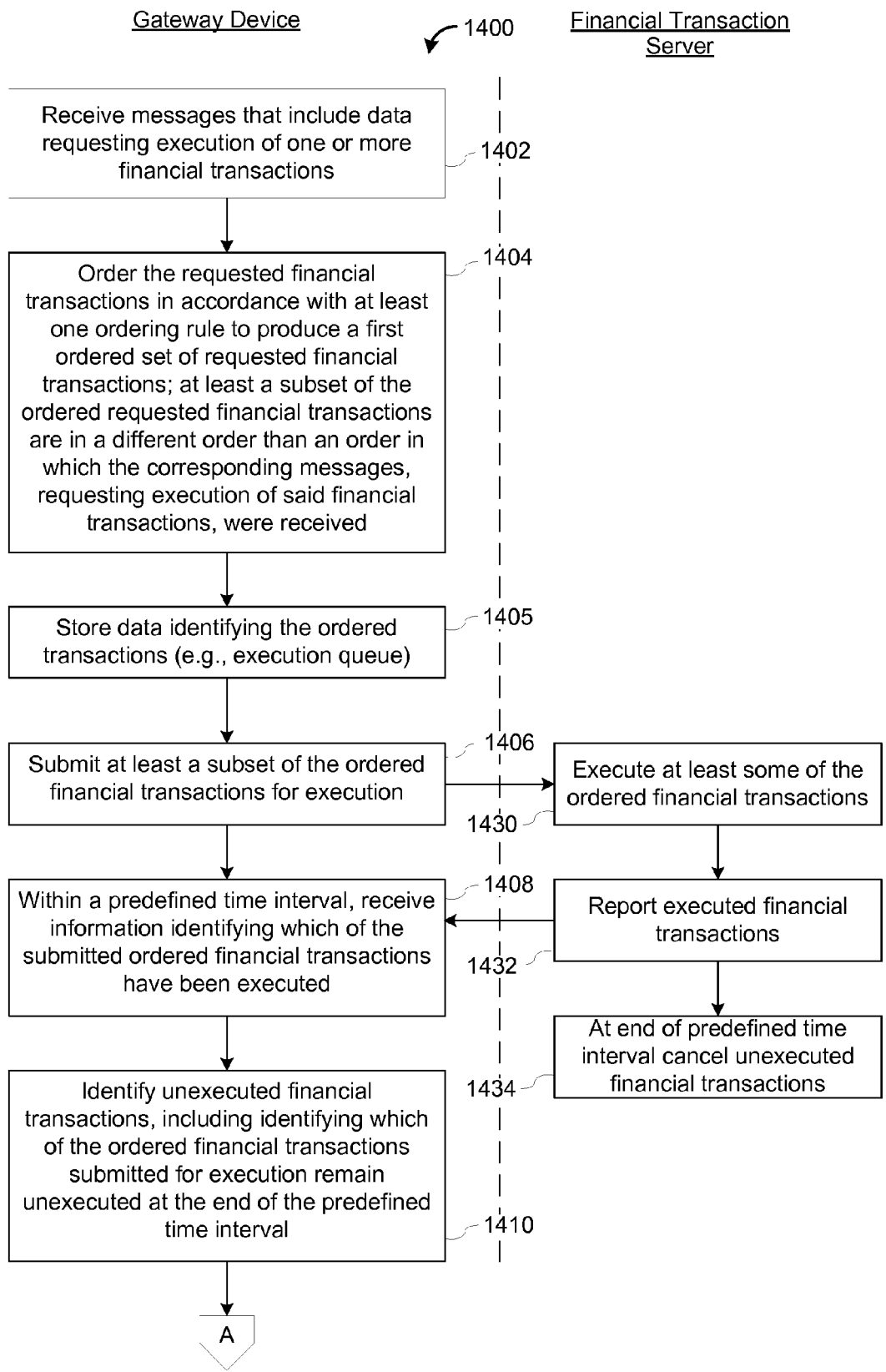
FIGS. 14A-14B are a flowchart of a method for ordering and submitting financial transactions for execution, reordering financial transactions not executed with a predefined time interval included in corrupted messages, and resubmitting the reordered financial transactions for execution, according to some embodiments.
Figure 14B:
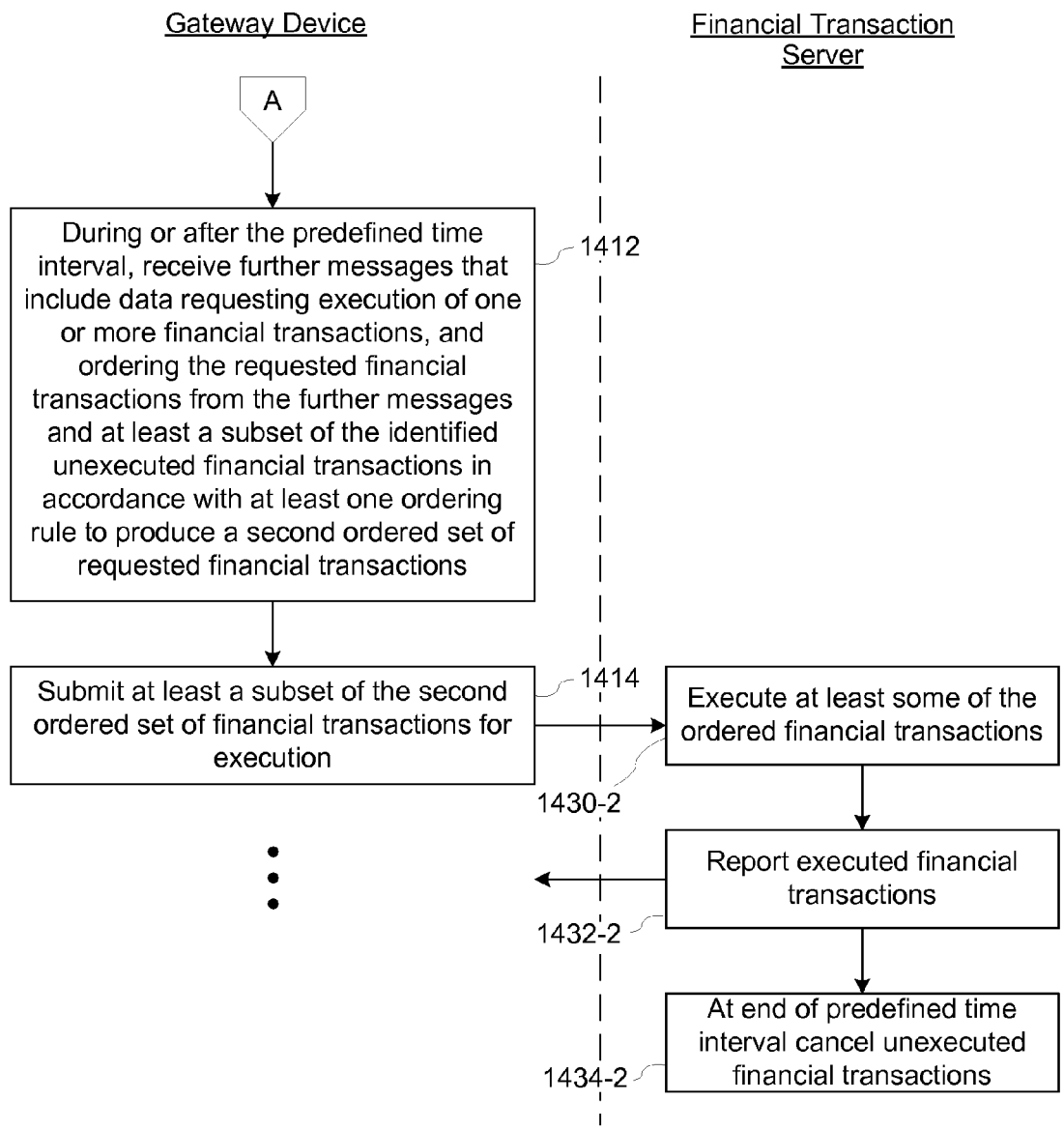

Referring to FIGS. 14A-14B, in some implementations of the aforementioned systems, financial transactions are ordered in accordance with at least one rule (e.g., for fairness) at a gateway device (e.g., any of the gateway devices described above), and then submitted by the gateway device to one or more financial transaction servers. In some implementations, the gateway device performs a method 1400 in which it receives messages that include data requesting execution of one or more financial transactions (1402). Furthermore, the gateway device orders (1404) the requested financial transactions in accordance with at least one ordering rule to produce a first ordered set of requested financial transactions. As a result, at least a subset of the ordered requested financial transactions are in a different order than an order in which the corresponding messages, requesting execution of the financial transactions, were received. The gateway devices stores (1405) data identifying the ordered transactions (e.g., in a transaction queue 212, see FIG. 3).

The gateway device submits (1406) at least a subset of the ordered financial transactions for execution. For example, the gateway device submits (1406) at least a subset of the ordered financial transactions to one or more financial transaction servers for execution.

In some implementations, each of the financial transaction servers are configured to execute (1430) at least some of the financial transactions sent to it by the gateway device, taking into account the ordering of the transactions, and to report (1432) back to the gateway device the executed financial transactions. Furthermore, in some implementations, each financial transaction server is configured to cancel (1434) unexecuted transactions at the end of a predefined time interval (e.g., N time units after receiving the ordered financial transactions from the gateway device; where examples of N are 0.1 second, 1 second, 2 seconds, and any value between those values). In some implementations, the predefined time interval is based on market conditions, or the rate at which transactions are being received by the gateway device or the financial transaction server, or other suitable factor(s). Optionally, in some implementations, each financial transaction server is configured to report back to the gateway device, at the end of the predefined interval, information identifying the unexecuted transactions, whose execution has been canceled.

In some implementations, the gateway device receives (1408) from each financial transaction server, within the aforementioned predefined time interval, information identifying which of the submitted ordered financial transactions have been executed. Furthermore, the gateway device identifies (1410) which of the ordered financial transactions submitted to the one or more financial transaction servers remain unexecuted at the end of the time interval. In some implementations, the gateway device identifies the unexecuted transactions using information received from the one or more financial transaction servers identifying which transactions were executed, for example by removing the executed financial transactions from the transaction queue, leaving in the transaction queue only the unexecuted transactions. Alternatively, the gateway device receives from the one or more financial transaction servers information identifying which of the ordered financial transactions submitted to the financial transaction server remain unexecuted at the end of the time interval.

During or after the predefined time interval, the gateway device receives (1412) further messages that include data requesting execution of one or more financial transactions, and orders the requested financial transactions from the further messages and at least a subset of the identified unexecuted financial transactions in accordance with at least one ordering rule to produce a second ordered set of requested financial transactions. The gateway device subsequently submits (1414) at least a subset of the second ordered set of requested financial transactions to the one or more financial transaction servers for execution.

In some implementations, the financial transaction server performs (1430-2, 1432-2, 1434-2) the same operations on the second ordered set of requested financial transactions as those described above with respect to the first ordered set of requested financial transactions.

The methods illustrated in FIGS. 7-14B are typically governed by instructions that are stored in a non-transitory computer readable storage medium and that are executed by at one or more processors of one or more gateway devices (or financial transaction servers). Each of the operations shown in FIGS. 7-14B may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium are typically source code, assembly language code, object code, or in another instruction format that is interpreted and/or executable by one or more processors.

Plural instances may be provided for components, operations or structures described herein as a single instance. Boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

In the foregoing description of example systems, methods, techniques and non-transitory computer readable media, numerous specific details are set forth in order to provide an understanding of various implementations, the principles upon which they are based, and practical applications. However, the illustrative discussions above are not intended to be exhaustive or to limit the scope of the claims. Many modifications and variations are possible in view of the above teachings.

What is claimed is:

1. A gateway system, comprising:
one or more communication interfaces for receiving messages from multiple senders and for sending transactions to one or more transaction processing systems;
at least one hardware processor;
memory storing at least one program for execution by the at least one hardware processor, wherein the at least one program, when executed by the at least one hardware processor, causes the gateway system to perform a method, comprising:
receiving, via the one or more communication interfaces, messages from multiple senders, the received messages including data identifying transactions to be performed by the one or more transaction processing systems, the received messages including a first message received from a first sender and a second message received from a second sender after the first message from the first sender is received, and a third message received from a third sender after the first message from the first sender is received, the first message including data identifying a first transaction to be performed and a particular transaction target that is a transaction target for the first transaction; wherein the first sender, second sender and third sender are distinct senders;
in accordance with a determination that the first message is corrupted,
identifying the particular transaction target from data in the first message; and
adding information identifying the particular transaction target to an interfered transaction list;
in accordance with a determination that the second message includes data identifying a second transaction, distinct from the first transaction, to be performed with respect to said particular transaction target, and that the particular transaction target is on the interfered transaction list,
delaying, by a time interval, sending the second transaction to any of the one or more transaction processing systems; and
in accordance with a determination that data in the third message does not identify any transaction to be performed with respect to any transaction target on the interfered transaction list, sending a third transaction, identified by data in the third message, to a transaction processing system of the one or more transaction processing systems, without delaying the sending of the third transaction by said time interval.

2. The gateway system of claim 1, wherein the at least one program, when executed by the at least one hardware processor, further causes the gateway system to:
add the second transaction to a quarantined transaction list in accordance with the determination that the second message includes data identifying the second transaction, distinct from the first transaction, to be performed with respect to said particular transaction target, and that the particular transaction target is on the interfered transaction list; and
after a first time interval, remove the second transaction from the quarantined transaction list and send the second transaction to a transaction processing system of the one or more transaction processing systems.

3. The gateway system of claim 2, wherein the at least one program, when executed by the at least one hardware processor, further causes the gateway system to:
remove the particular transaction target from the interfered transaction list after the particular transaction target has been on the interfered transaction list for at least a predetermined time period.

4. The gateway system of claim 1, wherein the at least one program, when executed by the at least one hardware processor, further causes the gateway system to:
remove the particular transaction target from the interfered transaction list after the particular transaction target has been on the interfered transaction list for at least a predetermined time period.

5. A non-transitory computer readable storage medium storing at least one program configured for execution by at least one hardware processor of a computer system comprising a gateway system, the at least one program comprising instructions to:
receive, via one or more communication interfaces of the gateway system, messages from multiple senders, the received messages including data identifying transactions to be performed by one or more transaction processing systems, the received messages including a first message received from a first sender and a second message received from a second sender after the first message from the first sender is received, and a third message received from a third sender after the first message from the first sender is received, the first message including data identifying a first transaction to be performed and a particular transaction target that is a transaction target for the first transaction; wherein the first sender, second sender and third sender are distinct senders;
in accordance with a determination that the first message is corrupted,
identify the particular transaction target from data in the first message; and
add information identifying the particular transaction target to an interfered transaction list;
in accordance with a determination that the second message includes data identifying a second transaction, distinct from the first transaction, to be performed with respect to said particular transaction target, and that the particular transaction target is on the interfered transaction list,
delay, by a time interval, sending the second transaction to any of the one or more transaction processing systems; and
in accordance with a determination that data in the third message does not identify any transaction to be performed with respect to any transaction target on the interfered transaction list, send a third transaction, identified by data in the third message, to a transaction processing system of the one or more transaction processing systems, without delaying the sending of the third transaction by said time interval.

6. The non-transitory computer readable storage medium of claim 5, wherein the at least one program further comprises instructions to:
add the second transaction to a quarantined transaction list in accordance with the determination that the second message includes data identifying the second transaction, distinct from the first transaction, to be performed with respect to said particular transaction target, and that the particular transaction target is on the interfered transaction list; and
after a first time interval, remove the second transaction from the quarantined transaction list and send the second transaction to a transaction processing system of the one or more transaction processing systems.

7. The non-transitory computer readable storage medium of claim 6, wherein the at least one program further comprises instructions to:
   remove the particular transaction target from the interfered transaction list after the particular transaction target has been on the interfered transaction list for at least a predetermined time period.

8. The non-transitory computer readable storage medium of claim 5, wherein the at least one program further comprises instructions to:
   remove the particular transaction target from the interfered transaction list after the particular transaction target has been on the interfered transaction list for at least a predetermined time period.

\* \* \* \* \*